US012676984B2

(12) United States Patent
Laroche et al.

(10) Patent No.: US 12,676,984 B2
(45) Date of Patent: Jul. 7, 2026

(54) VIDEO CODING AND DECODING

(71) Applicant: CANON KABUSHIKI KAISHA,
Tokyo (JP)

(72) Inventors: Guillaume Laroche, Saint Aubin
d'Aubigné (FR); Patrice Onno, Rennes
(FR)

(73) Assignee: Canon Kabushiki Kaisha, Tokyo (JP)

( * ) Notice: Subject to any disclaimer, the term of this
patent is extended or adjusted under 35
U.S.C. 154(b) by 0 days.

(21) Appl. No.: 18/857,141

(22) PCT Filed: Apr. 14, 2023

(86) PCT No.: PCT/EP2023/059833
§ 371 (c)(1),
(2) Date: Oct. 15, 2024

(87) PCT Pub. No.: WO2023/202956
PCT Pub. Date: Oct. 26, 2023

(65) Prior Publication Data
US 2025/0267277 A1      Aug. 21, 2025

(30) Foreign Application Priority Data
Apr. 19, 2022    (GB) ..................................... 2205721

(51) Int. Cl.
| | |
|---|---|
| *H04N 19/00* | (2014.01) |
| *H04N 19/14* | (2014.01) |
| *H04N 19/169* | (2014.01) |
| *H04N 19/513* | (2014.01) |
| *H04N 19/70* | (2014.01) |

(52) U.S. Cl.
CPC ........... *H04N 19/14* (2014.11); *H04N 19/188*
(2014.11); *H04N 19/513* (2014.11); *H04N*
*19/70* (2014.11)

(58) Field of Classification Search
CPC .... H04N 19/14; H04N 19/188; H04N 19/513;
H04N 19/70; H04N 19/147; H04N
19/176; H04N 19/174; H04N 19/61
See application file for complete search history.

(56) References Cited

U.S. PATENT DOCUMENTS

| | | | | |
|---|---|---|---|---|
| 8,761,266 B2 * | 6/2014 | Rodriguez | ........... | H04N 19/587 |
| | | | | 375/240.27 |
| 8,886,022 B2 * | 11/2014 | Rodriguez | ......... | H04N 21/4325 |
| | | | | 386/350 |
| 8,989,508 B2 * | 3/2015 | Deshpande | ............ | H04N 19/44 |
| | | | | 708/203 |
| 9,049,427 B2 * | 6/2015 | Hattori | ............... | G11B 20/1252 |

(Continued)

OTHER PUBLICATIONS

Wei Pu, et al., Palette Mode Coding in HEVC Screen Content
Coding Extension, IEEE Journal on Emerging and Selected Topics
in Circuits and Systems, vol. 6, No. 4, Dec. 2016, XP11636932A.

(Continued)

*Primary Examiner* — Frank F Huang
(74) *Attorney, Agent, or Firm* — Canon U.S.A., Inc. IP
Division

(57) ABSTRACT
A method of decoding a portion of an image is disclosed, the
method comprising, determining a threshold from a header
associated with the image portion, wherein a decoding
criterion is based on said threshold; and decoding said image
portion based on said criterion. An encoding method, and
corresponding devices are also disclosed.

19 Claims, 27 Drawing Sheets

(56)  References Cited

U.S. PATENT DOCUMENTS

| | | | | |
|---|---|---|---|---|
| 9,319,703 | B2 * | 4/2016 | Wang | H04N 19/463 |
| 9,969,299 | B2 * | 5/2018 | Murase | B60L 5/42 |
| 10,313,698 | B2 * | 6/2019 | Sullivan | H04N 21/23424 |
| 11,765,394 | B2 * | 9/2023 | Wang | H04N 19/187 |
| | | | | 375/240.25 |
| 11,812,062 | B2 * | 11/2023 | Wang | H04N 19/46 |
| 12,022,122 | B2 * | 6/2024 | Deshpande | H04N 19/423 |
| 2010/0189131 | A1 * | 7/2010 | Branam | H04N 21/44016 |
| | | | | 375/E7.026 |
| 2013/0188715 | A1 | 7/2013 | Seregin | |
| 2016/0127747 | A1 | 5/2016 | Hsiang | |
| 2019/0373255 | A1 | 12/2019 | Ye | |
| 2020/0382807 | A1 * | 12/2020 | Liu | H04N 19/56 |
| 2021/0195201 | A1 | 6/2021 | Li | |
| 2021/0385481 | A1 | 12/2021 | Liu | |
| 2021/0400299 | A1 | 12/2021 | Zhu | |

OTHER PUBLICATIONS

Jianhua Zheng, et al., Weighted predictive coding for quantization matrices, Joint Collaborative Team on Video Coding (JCT-VC) of ITU-T SG16 and WP3 and ISO/IEC JTC1/SC29/WG11, 8th Meeting, San Jose, US, Jan. 1-7, 2012, Doc. No. JCTVC-H0522, XP30111549A.

Philippe De Lagrange, et al., Non-CE7: Quantization matrices with single identifier and prediction from larger ones, Joint Video Experts Team (JVET) of ITU-T SG 16 WP 3 and ISO/IEC JTC 1/SC 29/WG 11, 15th Meeting, Gothenburg, SE, Jul. 3-12, 2019, Doc. No. JVET-O0223, XP30218892A.

Byeongdoo Choi, et al., On parameter set prediction, Joint Collaborative Team on Video Coding (JCT-VC) of ITU-T SG 16 WP 3 and ISO/IEC JTC 1/SC 29/WG 11, 13th Meeting, Incheon, KR, Apr. 18-26, 2013, Doc. No. JCTVC-M0165,XP30237146A.

* cited by examiner

1

VIDEO CODING AND DECODING

CROSS REFERENCE TO RELATED APPLICATION

This application is the National Phase application of PCT Application No. PCT/EP2023/059833, filed on Apr. 14, 2023 and titled "VIDEO CODING AND DECODING". This application claims the benefit under 35 U.S.C. § 119(a)-(d) of United Kingdom Patent Application No. 2205721.0, filed on Apr. 19, 2022 and titled "VIDEO CODING AND DECODING". Each of the above cited patent applications are incorporated herein by reference in its entirety.

FIELD OF INVENTION

The present invention relates to video coding and decoding.

BACKGROUND

The Joint Video Experts Team (JVET), a collaborative team formed by MPEG and ITU-T Study Group 16's VCEG, released a new video coding standard referred to as Versatile Video Coding (VVC). The goal of VVC is to provide significant improvements in compression performance over the existing HEVC standard (i.e., typically twice as much as before). The main target applications and services include—but not limited to—360-degree and high-dynamic-range (HDR) videos. Particular effectiveness was shown on ultra-high definition (UHD) video test material. Thus, we may expect compression efficiency gains well-beyond the targeted 50% for the final standard.

Since the end of the standardisation of VVC v1, JVET has launched an exploration phase by establishing an exploration software (ECM). It gathers additional tools and improvements of existing tools on top of the VVC standard to target better coding efficiency.

Amongst other modifications, compared to HEVC, VVC has a modified set of 'merge modes' for motion vector prediction which achieves greater coding efficiency at a cost of greater complexity. Motion vector prediction is enabled by deriving a list of 'motion vector predictor candidates' with the index of the selected candidate being signalled in the bitstream. The merge candidate list is generated for each coding unit (CU). But CUs may be split into smaller blocks for Decoder-side Motion Vector Refinement (DMVR) or other methods.

The make-up and order of this list can have significant impact on coding efficiency as an accurate motion vector predictor reduces the size of the residual or the distortion of the block predictor, and having such a candidate at the top of the list reduces the number of bits required to signal the selected candidate. The present invention aims to improve at least one of these aspects.

Modifications incorporated into VVC v1 and ECM mean there can be up to 10 motion vector predictor candidates; this enables a diversity of candidates, but the bitrate can increase if candidates lower down the list are selected.

SUMMARY OF INVENTION

The present invention broadly relates to how to transmit/receive (or derive) a value which enables a decoder to make decoding decisions. For example, how to reorder the list of candidates.

According to one aspect of the present invention there is provided a method of decoding a portion of an image, the method comprising, determining a threshold from a header associated with the image portion, wherein a decoding criterion is based on said threshold; and decoding said image portion based on said criterion. This provides increased coding performance as appropriate selection of the decoding criterion increases coding efficiency. Deriving this from a header allows for flexible signalling thus minimally affecting bit rate.

The method may comprise decoding a syntax element in the header which is capable of indicating the presence of the threshold in that header.

Optionally, the syntax element is also capable of indicating that the threshold has a default value.

Optionally, the syntax element is also capable of indicating that no threshold is transmitted and that the decoding process uses an alternative method.

Optionally, to increase decoding speed/simplicity, the method may further comprise skipping decoding of the corresponding syntax elements in hierarchically lower headers in the case where the syntax element indicates the presence of the threshold. Optionally, the syntax element is a flag Decision Methods The present invention is applicable to a number of decoding tools, for example the decoding comprises a decision to perform motion vector refinement based on the criterion. This improves the performance of this decoding tool.

Similarly, the decoding comprises a decision to perform motion vector ordering or removing based on the criterion. Appropriate selection of a decoding criterion leads to a more accurately ordered list, and thus a rate reduction.

Optionally, the method further comprises determining a coding mode and determining the threshold is based on the determined mode.

Optionally, the criterion relates to a cost.

Threshold Values Signalling

Optionally, to reduce the bitrate, determining the threshold comprises decoding a syntax element indicating a maximum number of bits of said threshold, Optionally, to reduce the bitrate, determining the threshold comprises decoding a syntax element indicating the number of bits of said threshold.

Optionally, to reduce the bitrate, the method comprises transforming the decoded threshold prior to using it in the decoding process. The transforming comprises dequantizing, performing a left bit shift and/or squaring.

Threshold Prediction

To further reduce the bitrate, the threshold value may be predicted.

Optionally, the method comprises decoding a flag indicating whether decoding the threshold comprises predicting the threshold or directly decoding the threshold from the header. Similarly, determining the threshold may comprise predicting the threshold or directly decoding the threshold from the header when not predictable.

Optionally, the method comprises decoding a residual and modifying the predicted threshold value based on said residual.

Optionally, the predicted threshold value is predicted based on a previously decoded threshold. Optionally, the previously decoded threshold is from a hierarchically higher level than said header.

Optionally, the predicted threshold value is predicted based on a syntax element relating to the same header.

Advantageously, the syntax element is one which is indicative of the reconstructed quality of the image portion.

Optionally, the syntax element is a quantization parameter or quantization parameter offset. This element is already known by the decoder and is likely to be correlated to a threshold.

Optionally, the method comprises either: (a) decoding a flag indicating that the threshold is correctly predicted; or (b) verifying if the threshold is associated with a syntax element relating to the same header. For increased flexibility, the method may comprise decoding a flag indicating whether to use option (a) or (b).

For ease of calculation, an association between the syntax element relating to the same header and a threshold value may be determined from a table.

Optionally, to reduce the bitrate, the table is transmitted in a hierarchically higher level than the header.

Optionally, for increased flexibility, each syntax element may be transmitted along with its associated threshold so as to generate the table. Advantageously, the table is predictively coded.

Optionally, to reduce the bitrate, the table is generated without duplicates.

Optionally, the table is used to determine a block level threshold when the syntax element is defined at the block level.

Threshold Represented by an Index

Optionally, determining the threshold comprises decoding an index indicating a threshold value from among a plurality of threshold values known by the decoder. This allows for signalling with a reduced number of bits.

Optionally, the method comprises receiving the plurality of threshold values. Optionally, the plurality of threshold values are transmitted in a hierarchically higher level than the header.

To enable efficient decoding, the method may comprise decoding a variable indicating the number of received threshold values.

To reduce the bitrate, the plurality of threshold values may be transmitted in a header at a level relating to a plurality of image portions. Optionally, the header at a level relating to a plurality of image portions is a sequence parameter set header.

To provide increased flexibility, one value of the index may indicate that a threshold value not in the plurality of threshold values is to be decoded from the header. Optionally, the value of the index is a maximum value.

Optionally, the method further comprises adding the threshold value decoded from the header to the plurality of threshold values and associating this with the index.

According to another aspect of the invention there is provided a method of encoding a header associated with a plurality of image portions, the method comprising: determining a threshold for each image portion, said threshold to be used to determine a decoding criterion for said image portion; generating an index of threshold values; wherein said index is ordered based on a frequency of occurrence of the threshold values; and encoding the index into the header. Such a method results in the most likely thresholds being encoded with the smallest index, leading to a rate reduction.

Optionally, the header is a sequence parameter set (SPS).

In another aspect according to the invention, there is provided a method of encoding a portion of an image, the method comprising, determining a decoding criterion for the image portion determining a threshold used to determine the criterion; signalling the threshold in a header associated with the image portion; and encoding said image portion based on said criterion.

In an aspect according to the invention, there is provided an apparatus for encoding image data into a bitstream, said apparatus being configured to perform any aspect or embodiment recited above.

In an aspect according to the invention, there is provided an apparatus for decoding image data from a bitstream, said apparatus being configured perform any aspect or embodiment recited above.

In another aspect according to the invention, there is provide a (computer) program which when upon execution causes a programmable apparatus to perform a method according to any aspect or embodiment recited above. The program may be store on a computer readable storage medium.

The program may be provided on its own or may be carried on, by or in a carrier medium. The carrier medium may be non-transitory, for example a storage medium, in particular a computer-readable storage medium. The carrier medium may also be transitory, for example a signal or other transmission medium. The signal may be transmitted via any suitable network, including the Internet.

Further features of the invention are characterised by the independent and dependent claims Any feature in one aspect of the invention may be applied to other aspects of the invention, in any appropriate combination. In particular, method aspects may be applied to apparatus aspects, and vice versa. Furthermore, features implemented in hardware may be implemented in software, and vice versa. Any reference to software and hardware features herein should be construed accordingly Any apparatus feature as described herein may also be provided as a method feature, and vice versa.

As used herein, means plus function features may be expressed alternatively in terms of their corresponding structure, such as a suitably programmed processor and associated memory.

It should also be appreciated that particular combinations of the various features described and defined in any aspects of the invention can be implemented and/or supplied and/or used independently

BRIEF DESCRIPTION OF THE DRAWINGS

Reference will now be made, by way of example, to the accompanying drawings, in which.

DETAILED DESCRIPTION

Figure 1:
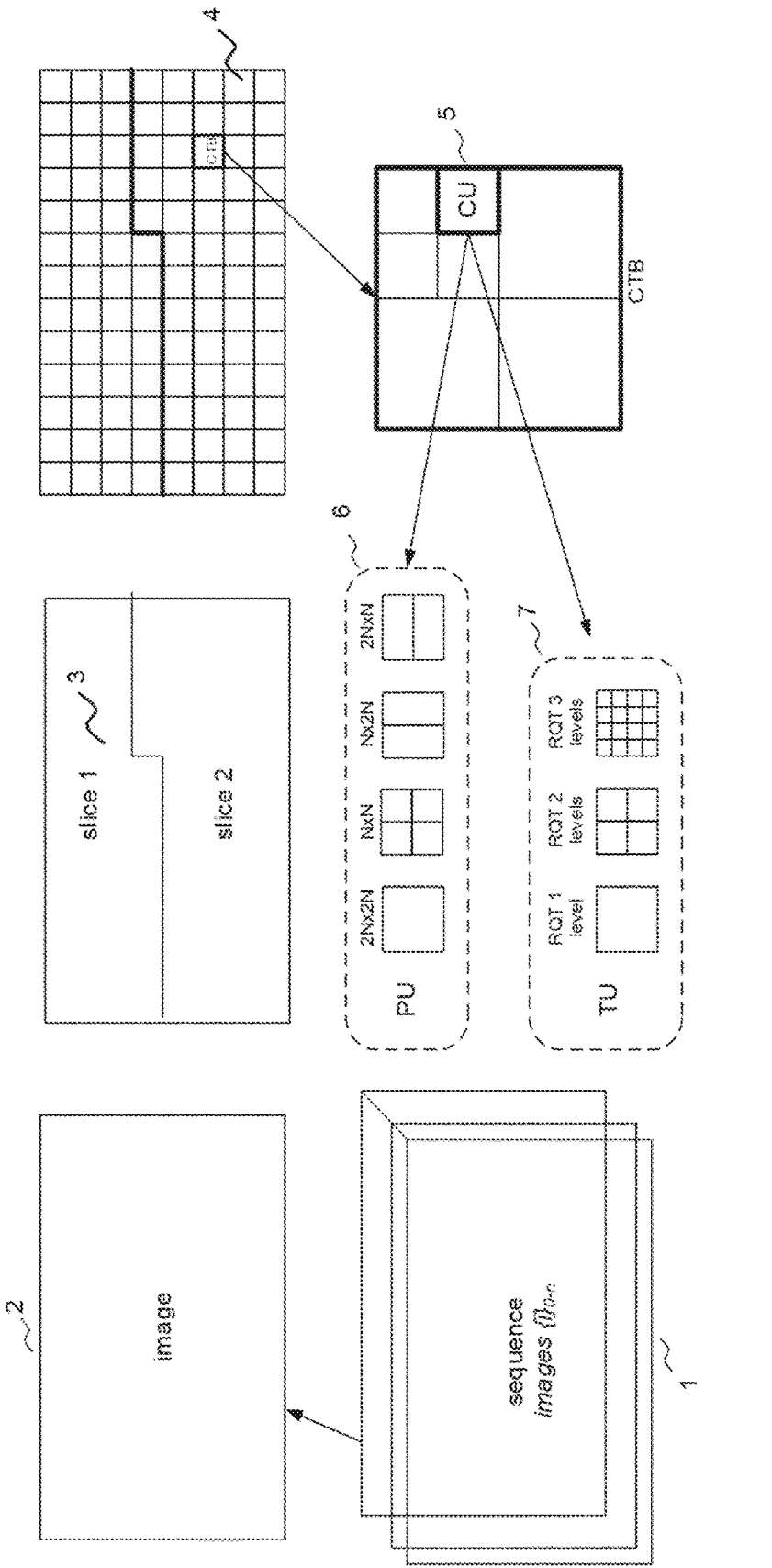
FIG. 1 is a diagram for use in explaining a coding structure used in HEVC.

FIG. 1 relates to a coding structure used in the High Efficiency Video Coding (HEVC) video and Versatile Video Coding (VVC) standards. A video sequence 1 is made up of a succession of digital images i. Each such digital image is represented by one or more matrices. The matrix coefficients represent pixels.

An image 2 of the sequence may be divided into slices 3. A slice may in some instances constitute an entire image. These slices are divided into non-overlapping Coding Tree Units (CTUs). A Coding Tree Unit (CTU) is the basic processing unit of the High Efficiency Video Coding (HEVC) video standard and conceptually corresponds in structure to macroblock units that were used in several previous video standards. A CTU is also sometimes referred to as a Largest Coding Unit (LCU). A CTU has luma and chroma component parts, each of which component parts is called a Coding Tree Block (CTB). These different color components are not shown in FIG. 1.

A CTU is generally of size 64 pixels×64 pixels for HEVC, yet for VVC this size can be 128 pixels×128 pixels. Each CTU may in turn be iteratively divided into smaller variable-size Coding Units (CUs) 5 using a quadtree decomposition.

Coding units are the elementary coding elements and are constituted by two kinds of sub-unit called a Prediction Unit (PU) and a Transform Unit (TU). The maximum size of a PU or TU is equal to the CU size. A Prediction Unit corresponds to the partition of the CU for prediction of pixels values. Various different partitions of a CU into PUs are possible as shown by 606 including a partition into 4 square PUs and two different partitions into 2 rectangular PUs. A Transform Unit is an elementary unit that is subjected to spatial transformation using DCT. A CU can be partitioned into TUs based on a quadtree representation 607.

Each slice is embedded in one Network Abstraction Layer (NAL) unit. In addition, the coding parameters of the video sequence are stored in dedicated NAL units called parameter sets. In HEVC and H.264/AVC two kinds of parameter sets NAL units are employed: first, a Sequence Parameter Set (SPS) NAL unit that gathers all parameters that are unchanged during the whole video sequence. Typically, it handles the coding profile, the size of the video frames and other parameters. Secondly, a Picture Parameter Set (PPS) NAL unit includes parameters that may change from one image (or frame) to another of a sequence. HEVC also includes a Video Parameter Set (VPS) NAL unit which contains parameters describing the overall structure of the bitstream. The VPS is a type of parameter set defined in HEVC, and applies to all of the layers of a bitstream. A layer may contain multiple temporal sub-layers, and all version 1 bitstreams are restricted to a single layer. HEVC has certain layered extensions for scalability and multiview and these will enable multiple layers, with a backwards compatible version 1 base layer.

Other ways of splitting an image have been introduced in VVC including subpictures, which are independently coded groups of one or more slices.

Figure 2:
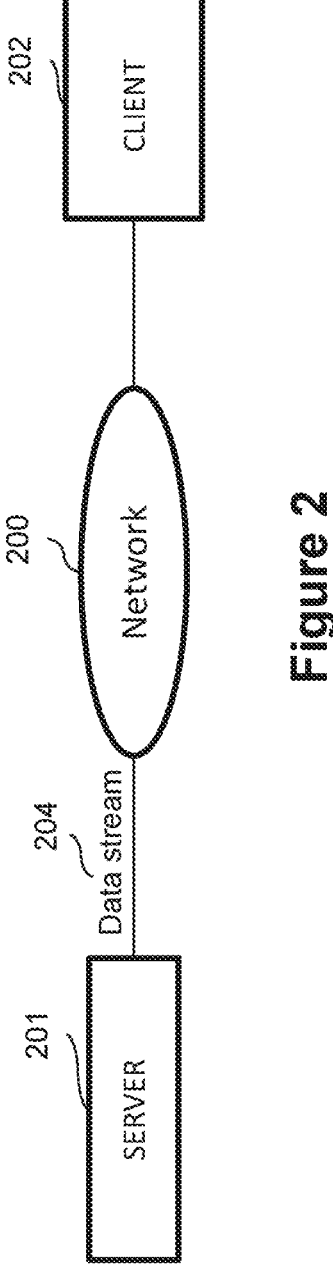
FIG. 2 is a block diagram schematically illustrating a data communication system in which one or more embodiments of the invention may be implemented.

FIG. 2 illustrates a data communication system in which one or more embodiments of the invention may be implemented. The data communication system comprises a transmission device, in this case a server 201, which is operable to transmit data packets of a data stream to a receiving device, in this case a client terminal 202, via a data communication network 200. The data communication network 200 may be a Wide Area Network (WAN) or a Local Area Network (LAN). Such a network may be for example a wireless network (Wifi/802.11a or b or g), an Ethernet network, an Internet network or a mixed network composed of several different networks. In a particular embodiment of the invention the data communication system may be a digital television broadcast system in which the server 201 sends the same data content to multiple clients.

The data stream 204 provided by the server 201 may be composed of multimedia data representing video and audio data. Audio and video data streams may, in some embodiments of the invention, be captured by the server 201 using a microphone and a camera respectively. In some embodiments data streams may be stored on the server 201 or received by the server 201 from another data provider, or generated at the server 201. The server 201 is provided with an encoder for encoding video and audio streams in particular to provide a compressed bitstream for transmission that is a more compact representation of the data presented as input to the encoder.

In order to obtain a better ratio of the quality of transmitted data to quantity of transmitted data, the compression of the video data may be for example in accordance with the HEVC format or H.264/AVC format or VVC format.

The client 202 receives the transmitted bitstream and decodes the reconstructed bitstream to reproduce video images on a display device and the audio data by a loud speaker.

Although a streaming scenario is considered in the example of FIG. 2, it will be appreciated that in some embodiments of the invention the data communication between an encoder and a decoder may be performed using for example a media storage device such as an optical disc.

In one or more embodiments of the invention a video image is transmitted with data representative of compensation offsets for application to reconstructed pixels of the image to provide filtered pixels in a final image.

Figure 3:
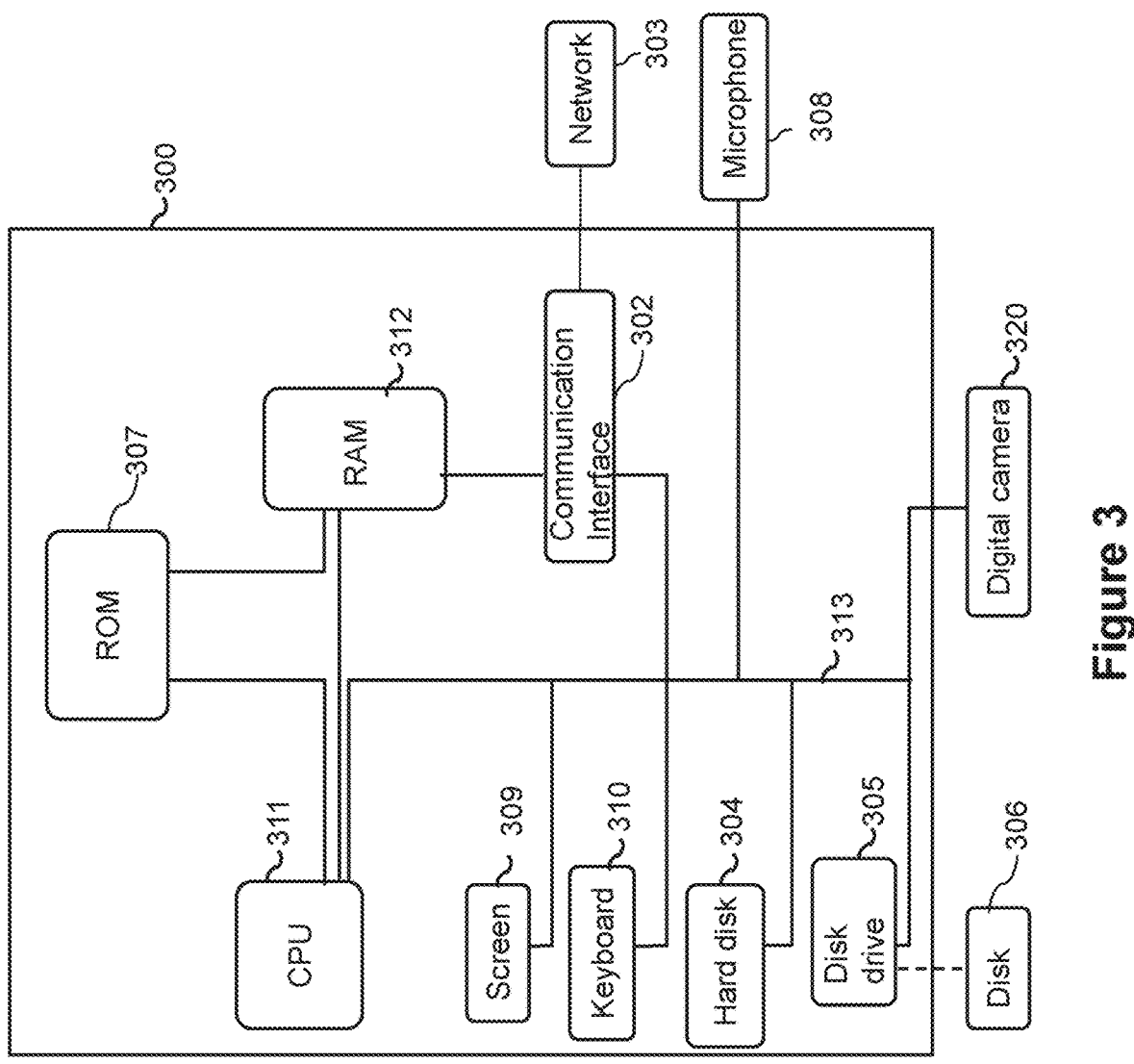
FIG. 3 is a block diagram illustrating components of a processing device in which one or more embodiments of the invention may be implemented.

FIG. 3 schematically illustrates a processing device 300 configured to implement at least one embodiment of the present invention. The processing device 300 may be a device such as a micro-computer, a workstation or a light portable device. The device 300 comprises a communication bus 313 connected to:

a central processing unit 311, such as a microprocessor, denoted CPU;

a read only memory 306, denoted ROM, for storing computer programs for implementing the invention;

a random access memory 312, denoted RAM, for storing the executable code of the method of embodiments of the invention as well as the registers adapted to record variables and parameters necessary for implementing the method of encoding a sequence of digital images and/or the method of decoding a bitstream according to embodiments of the invention; and a communication interface 302 connected to a communication network 303 over which digital data to be processed are transmitted or received Optionally, the apparatus 300 may also include the following components:

a data storage means 304 such as a hard disk, for storing computer programs for implementing methods of one or more embodiments of the invention and data used or produced during the implementation of one or more embodiments of the invention;

a disk drive 305 for a disk 306, the disk drive being adapted to read data from the disk 306 or to write data onto said disk;

a screen 309 for displaying data and/or serving as a graphical interface with the user, by means of a keyboard 310 or any other pointing means.

The apparatus 300 can be connected to various peripherals, such as for example a digital camera 320 or a microphone 308, each being connected to an input/output card (not shown) so as to supply multimedia data to the apparatus 300.

The communication bus provides communication and interoperability between the various elements included in the apparatus 300 or connected to it. The representation of the bus is not limiting and in particular the central processing unit is operable to communicate instructions to any element of the apparatus 300 directly or by means of another element of the apparatus 300.

The disk 306 can be replaced by any information medium such as for example a compact disk (CD-ROM), rewritable or not, a ZIP disk or a memory card and, in general terms, by an information storage means that can be read by a microcomputer or by a microprocessor, integrated or not into the apparatus, possibly removable and adapted to store one or more programs whose execution enables the method of encoding a sequence of digital images and/or the method of decoding a bitstream according to the invention to be implemented.

The executable code may be stored either in read only memory 306, on the hard disk 304 or on a removable digital medium such as for example a disk 306 as described previously. According to a variant, the executable code of the programs can be received by means of the communication network 303, via the interface 302, in order to be stored in one of the storage means of the apparatus 300 before being executed, such as the hard disk 304.

The central processing unit 311 is adapted to control and direct the execution of the instructions or portions of software code of the program or programs according to the invention, instructions that are stored in one of the aforementioned storage means. On powering up, the program or programs that are stored in a non-volatile memory, for example on the hard disk 304 or in the read only memory 306, are transferred into the random access memory 312, which then contains the executable code of the program or programs, as well as registers for storing the variables and parameters necessary for implementing the invention.

In this embodiment, the apparatus is a programmable apparatus which uses software to implement the invention. However, alternatively, the present invention may be implemented in hardware (for example, in the form of an Application Specific Integrated Circuit or ASIC).

Figure 4:
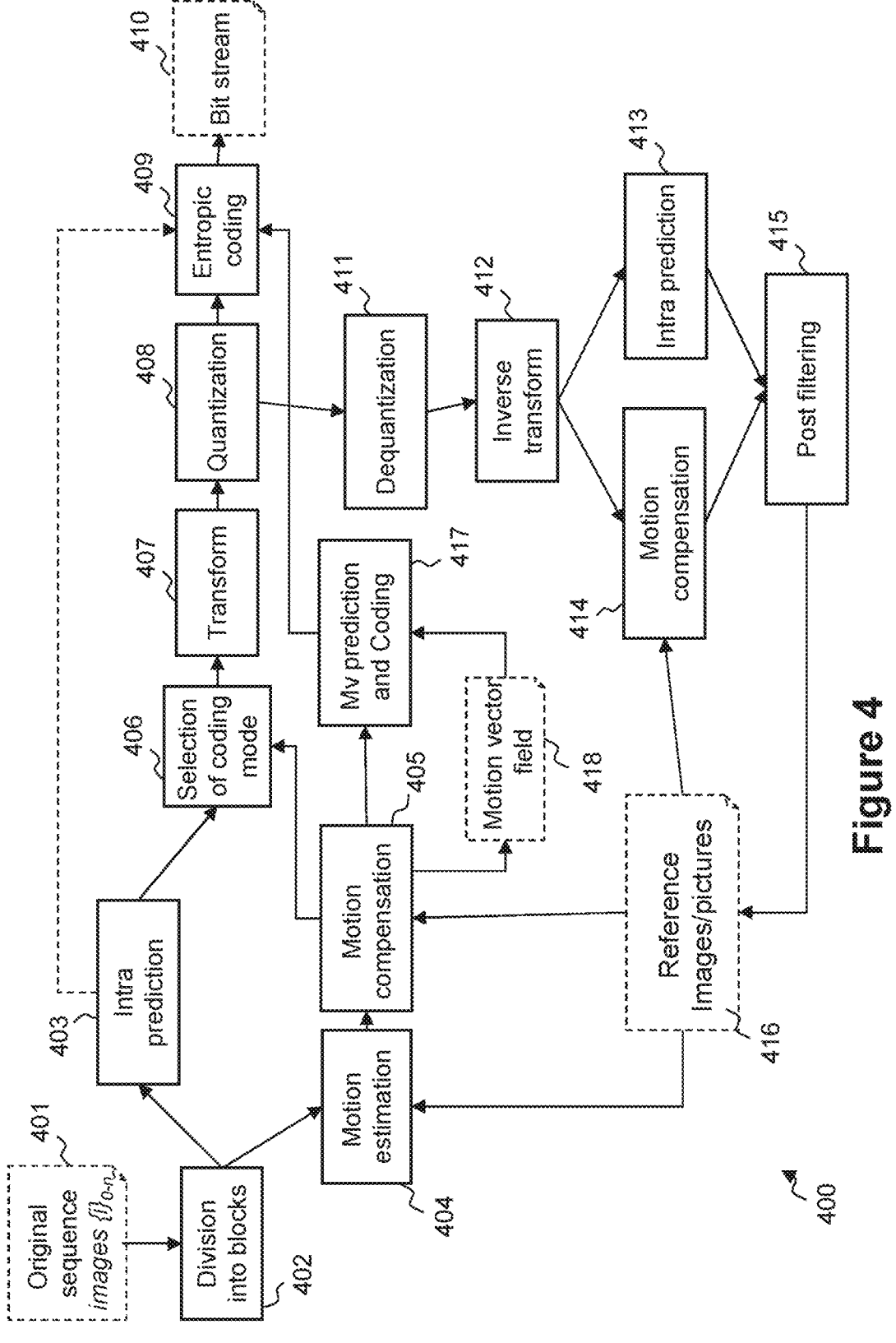
FIG. 4 is a flow chart illustrating steps of an encoding method according to embodiments of the invention.

FIG. 4 illustrates a block diagram of an encoder according to at least one embodiment of the invention. The encoder is represented by connected modules, each module being adapted to implement, for example in the form of programming instructions to be executed by the CPU 311 of device 300, at least one corresponding step of a method implementing at least one embodiment of encoding an image of a sequence of images according to one or more embodiments of the invention.

An original sequence of digital images i0 to in 401 is received as an input by the encoder 400. Each digital image is represented by a set of samples, sometimes also referred to as pixels (hereinafter, they are referred to as pixels).

A bitstream 410 is output by the encoder 400 after implementation of the encoding process. The bitstream 410 comprises a plurality of encoding units or slices, each slice comprising a slice header for transmitting encoding values of encoding parameters used to encode the slice and a slice body, comprising encoded video data.

The input digital images i0 to in 401 are divided into blocks of pixels by module 402. The blocks correspond to image portions and may be of variable sizes (e.g. 4×4, 8×8, 16×16, 32×32, 64×64, 128×128 pixels and several rectangular block sizes can be also considered). A coding mode is selected for each input block. Two families of coding modes are provided: coding modes based on spatial prediction coding (Intra prediction), and coding modes based on temporal prediction (Inter coding, Merge, SKIP). The possible coding modes are tested.

Module 403 implements an Intra prediction process, in which the given block to be encoded is predicted by a predictor computed from pixels of the neighbourhood of said block to be encoded. An indication of the selected Intra predictor and the difference between the given block and its predictor is encoded to provide a residual if the Intra coding is selected.

Temporal prediction is implemented by motion estimation module 404 and motion compensation module 405. Firstly a reference image from among a set of reference images 416 is selected, and a portion of the reference image, also called reference area or image portion, which is the closest area (closest in terms of pixel value similarity) to the given block to be encoded, is selected by the motion estimation module 404. Motion compensation module 405 then predicts the block to be encoded using the selected area. The difference between the selected reference area and the given block, also called a residual block, is computed by the motion compensation module 405. The selected reference area is indicated using a motion vector.

Thus, in both cases (spatial and temporal prediction), a residual is computed by subtracting the predictor from the original block.

In the INTRA prediction implemented by module 403, a prediction direction is encoded. In the Inter prediction implemented by modules 404, 405, 416, 418, 417, at least one motion vector or data for identifying such motion vector is encoded for the temporal prediction.

Information relevant to the motion vector and the residual block is encoded if the Inter prediction is selected. To further reduce the bitrate, assuming that motion is homogeneous, the motion vector is encoded by difference with respect to a motion vector predictor. Motion vector predictors from a set of motion information predictor candidates is obtained from the motion vectors field 418 by a motion vector prediction and coding module 417.

The encoder 400 further comprises a selection module 406 for selection of the coding mode by applying an encoding cost criterion, such as a rate-distortion criterion. In order to further reduce redundancies a transform (such as DCT) is applied by transform module 407 to the residual block, the transformed data obtained is then quantized by quantization module 408 and entropy encoded by entropy encoding module 409. Finally, the encoded residual block of the current block being encoded is inserted into the bitstream 410.

The encoder 400 also performs decoding of the encoded image in order to produce a reference image (e.g. those in Reference images/pictures 416) for the motion estimation of the subsequent images. This enables the encoder and the decoder receiving the bitstream to have the same reference frames (reconstructed images or image portions are used). The inverse quantization ("dequantization") module 411 performs inverse quantization ("dequantization") of the quantized data, followed by an inverse transform by inverse transform module 412. The intra prediction module 413 uses the prediction information to determine which predictor to use for a given block and the motion compensation module 414 actually adds the residual obtained by module 412 to the reference area obtained from the set of reference images 416.

Post filtering is then applied by module 415 to filter the reconstructed frame (image or image portions) of pixels. In the embodiments of the invention an SAO loop filter is used in which compensation offsets are added to the pixel values of the reconstructed pixels of the reconstructed image. It is understood that post filtering does not always have to performed. Also, any other type of post filtering may also be performed in addition to, or instead of, the SAO loop filtering.

Figure 5:
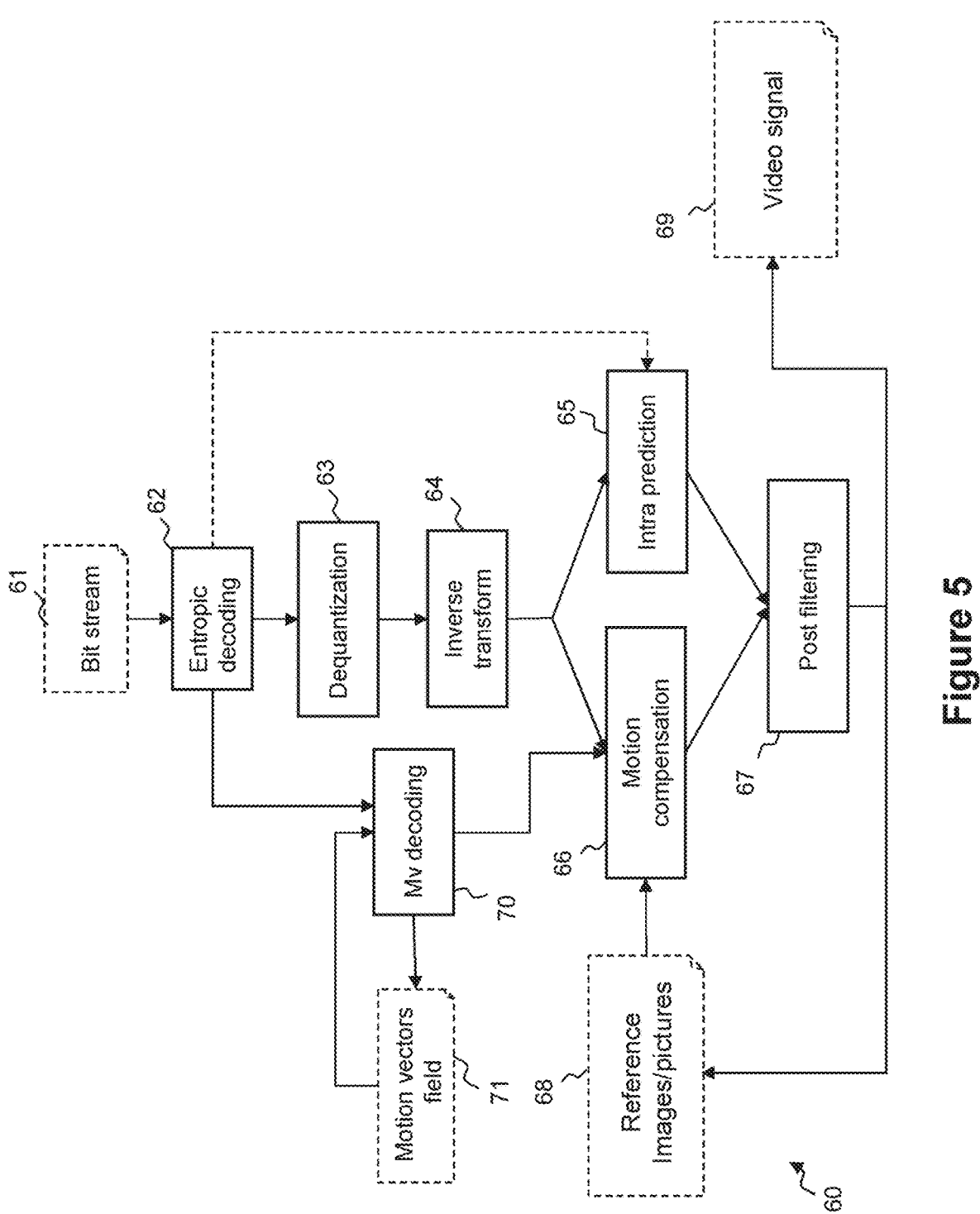
FIG. 5 is a flow chart illustrating steps of a decoding method according to embodiments of the invention.

FIG. 5 illustrates a block diagram of a decoder 60 which may be used to receive data from an encoder according an embodiment of the invention. The decoder is represented by connected modules, each module being adapted to implement, for example in the form of programming instructions to be executed by the CPU 311 of device 300, a corresponding step of a method implemented by the decoder 60.

The decoder 60 receives a bitstream 61 comprising encoded units (e.g. data corresponding to a block or a coding unit), each one being composed of a header containing information on encoding parameters and a body containing the encoded video data. As explained with respect to FIG. 4, the encoded video data is entropy encoded, and the motion vector predictors' indexes are encoded, for a given block, on a predetermined number of bits. The received encoded video data is entropy decoded by module 62. The residual data are then dequantized by module 63 and then an inverse transform is applied by module 64 to obtain pixel values.

The mode data indicating the coding mode are also entropy decoded and based on the mode, an INTRA type decoding or an INTER type decoding is performed on the encoded blocks (units/sets/groups) of image data.

In the case of INTRA mode, an INTRA predictor is determined by intra prediction module 65 based on the intra prediction mode specified in the bitstream.

If the mode is INTER, the motion prediction information is extracted from the bitstream so as to find (identify) the reference area used by the encoder. The motion prediction information comprises the reference frame index and the motion vector residual. The motion vector predictor is added to the motion vector residual by motion vector decoding module 70 in order to obtain the motion vector. The various motion predictor tools used in VVC are discussed in more detail below with reference to FIGS. 6-10.

Motion vector decoding module 70 applies motion vector decoding for each current block encoded by motion prediction. Once an index of the motion vector predictor for the current block has been obtained, the actual value of the motion vector associated with the current block can be decoded and used to apply motion compensation by module 66. The reference image portion indicated by the decoded motion vector is extracted from a reference image 68 to apply the motion compensation 66. The motion vector field data 71 is updated with the decoded motion vector in order to be used for the prediction of subsequent decoded motion vectors.

Finally, a decoded block is obtained. Where appropriate, post filtering is applied by post filtering module 67. A decoded video signal 69 is finally obtained and provided by the decoder 60.

Figure 21:
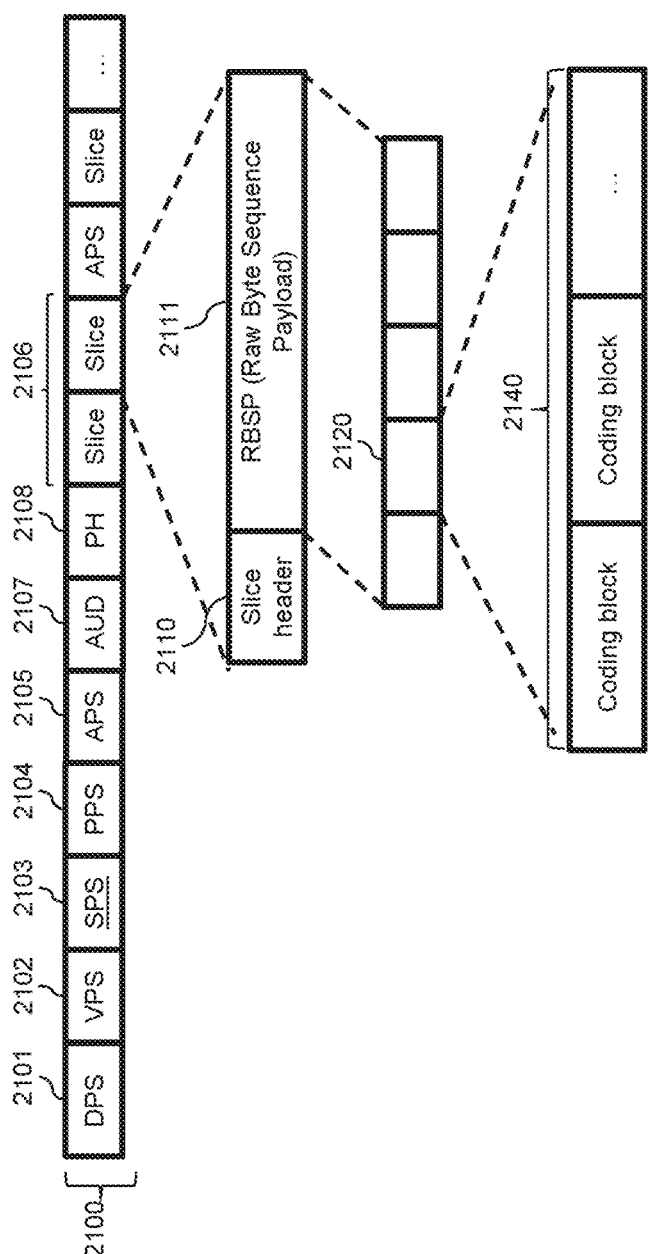
FIG. 21 illustrates the structure of the bitstream in the exemplary coding system VVC.

FIG. 21 illustrates the organisation of the bitstream in the exemplary coding system VVC as describe in JVET-Q2001-vD.

A bitstream 2100 according to the VVC coding system is composed of an ordered sequence of syntax elements and coded data. The syntax elements and coded data are placed into Network Abstraction Layer (NAL) units 2101-2108. There are different NAL unit types. The network abstraction layer provides the ability to encapsulate the bitstream into different protocols, like RTP/IP, standing for Real Time Protocol/Internet Protocol, ISO Base Media File Format, etc. The network abstraction layer also provides a framework for packet loss resilience.

NAL units are divided into Video Coding Layer (VCL) NAL units and non-VCL NAL units. The VCL NAL units contain the actual encoded video data. The non-VCL NAL units contain additional information. This additional information may be parameters needed for the decoding of the encoded video data or supplemental data that may enhance usability of the decoded video data. NAL units 2106 correspond to slices and constitute the VCL NAL units of the bitstream.

Different NAL units 2101-2105 correspond to different parameter sets, these NAL units are non-VCL NAL units. The Decoder Parameter Set (DPS) NAL unit 301 contains parameters that are constant for a given decoding process. The Video Parameter Set (VPS) NAL unit 2102 contains parameters defined for the whole video, and thus the whole bitstream. The DPS NAL unit may define parameters more static than the parameters in the VPS. In other words, the parameters of DPS change less frequently than the parameter of the VPS.

The Sequence Parameter Set (SPS) NAL unit 2103 contains parameters defined for a video sequence. In particular, the SPS NAL unit may define the sub pictures layout and associated parameters of the video sequences. The parameters associated to each subpicture specifies the coding constraints applied to the subpicture. In particular, it comprises a flag indicating that the temporal prediction between subpictures is restricted to the data coming from the same subpicture. Another flag may enable or disable the loop filters across the subpicture boundaries.

The Picture Parameter Set (PPS) NAL unit 2104, PPS contains parameters defined for a picture or a group of pictures. The Adaptation Parameter Set (APS) NAL unit 2105, contains parameters for loop filters typically the Adaptive Loop Filter (ALF) or the reshaper model (or luma mapping with chroma scaling (LMCS) model) or the scaling matrices that are used at the slice level.

The syntax of the PPS as proposed in the current version of VVC comprises syntax elements that specifies the size of the picture in luma samples and also the partitioning of each picture in tiles and slices.

The PPS contains syntax elements that make it possible to determine the slices location in a frame. Since a subpicture forms a rectangular region in the frame, it is possible to determine the set of slices, the parts of tiles or the tiles that belong to a subpicture from the Parameter Sets NAL units. The PPS as with the APS have an ID mechanism to limit the amount of same PPS's transmitted.

The main difference between the PPS and Picture Header is it transmission, the PPS is generally transmitted for a group of pictures compared to the PH which is systematically transmitted for each Picture. Accordingly, the PPS compared to the PH contains parameters which can be constant for several picture.

The bitstream may also contain Supplemental Enhancement Information (SEI) NAL units (not represented in FIG. 21). The periodicity of occurrence of these parameter sets in the bitstream is variable. A VPS that is defined for the whole bitstream may occur only once in the bitstream. To the contrary, an APS that is defined for a slice may occur once for each slice in each picture. Actually, different slices may rely on the same APS and thus there are generally fewer APS than slices in each picture. In particular, the APS is defined in the picture header. Yet, the ALF APS can be refined in the slice header.

The Access Unit Delimiter (AUD) NAL unit 2107 separates two access units. An access unit is a set of NAL units which may comprise one or more coded pictures with the same decoding timestamp. This optional NAL unit contains only one syntax element in current VVC specification: pic_type, this syntax element. indicates that the slice_type values for all slices of the coded pictures in the AU. If pic_type is set equal to 0, the AU contain only Intra slice. If equal to 1, it contains P and I slices. If equal to 2 it contains B, P or Intra slice This NAL unit contains only one syntax element the pic-type.

Reference Picture Lists

In VVC, there is the possibilities to transmit a set of reference picture lists in the SPS or in Picture header or slice header. The principle is to identified the POC difference between a current picture and its reference frames. In that case, as generally several frames of GOP share the same POC difference between reference frame, only one set need to be transmitted. When the set has been already transmitted it can be transmitted with an index which save rate dedicated to this reference picture signalling.

Motion Prediction (INTER) Modes

HEVC uses 3 different INTER modes: the Inter mode (Advanced Motion Vector Prediction (AMVP)), the "classical" Merge mode (i.e. the "non-Affine Merge mode" or also known as "n egular" Merge mode) and the "classical" Merge Skip mode (i.e. the "non-Affine Merge Skip" mode or also known as "regular" Merge Skip mode). The main difference between these modes is the data signalling in the bitstream. For the Motion vector coding, the current HEVC standard includes a competitive based scheme for Motion vector prediction which was not present in earlier versions of the standard. It means that several candidates are competing with the rate distortion criterion at encoder side in order to find the best motion vector predictor or the best motion information for respectively the Inter or the Merge modes (i.e. the "classical/regular" Merge mode or the "classical/regular" Merge Skip mode). An index corresponding to the best predictors or the best candidate of the motion information is then inserted in the bitstream, together with a 'residual' which represents the difference between the predicted value and the actual value. The decoder can derive the same set of predictors or candidates and uses the best one according to the decoded index. Using the residual, the decoder can then recreate the original value.

In the Screen Content Extension of HEVC, the new coding tool called Intra Block Copy (IBC) is signalled as any of those three INTER modes, the difference between IBC and the equivalent INTER mode being made by checking whether the reference frame is the current one. This can be implemented e.g. by checking the reference index of the list L0, and deducing this is Intra Block Copy if this is the last frame in that list. Another way to do is comparing the Picture Order Count of current and reference frames: if equal, this is Intra Block Copy.

The design of the derivation of predictors and candidates is important in achieving the best coding efficiency without a disproportionate impact on complexity. In HEVC two motion vector derivations are used: one for Inter mode (Advanced Motion Vector Prediction (AMVP)) and one for Merge modes (Merge derivation process—for the classical Merge mode and the classical Merge Skip mode). The following describes the various motion predictor modes used in VVC.

Figure 6:
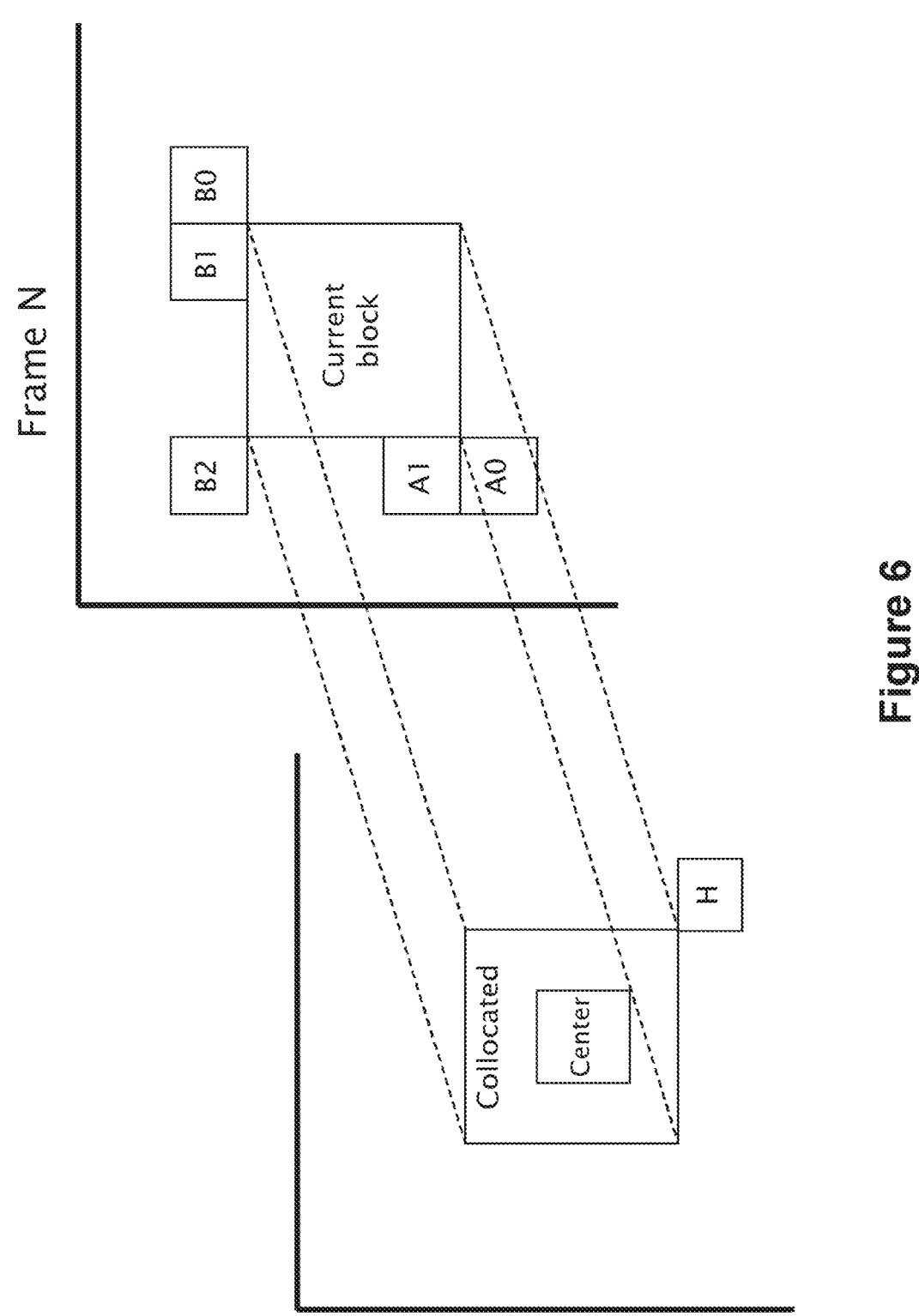
FIGS. 6 and 7 show the labelling scheme used to describe blocks situated relative to a current block.

FIG. 6 show the labelling scheme used herein to describe blocks situated relative to a current block (i.e. the block currently being en/decoded) between frames (FIG. 6).

VVC Merge Modes

In VVC several inter modes have been added compared to HEVC. In particular, new Merge modes have been added to the regular Merge mode of HEVC.

Affine Mode (SubBlock Mode)

In HEVC, only translation motion model is applied for motion compensation prediction (MCP). While in the real world, there are many kinds of motion, e.g. zoom in/out, rotation, perspective motions and other irregular motions.

In the JEM, a simplified affine transform motion compensation prediction is applied and the general principle of Affine mode is described below based on an extract of document JVET-G1001 presented at a JVET meeting in Torino at 13-21 Jul. 2017. This entire document is hereby incorporated by reference insofar as it describes other algorithms used in JEM.

Figure 8:
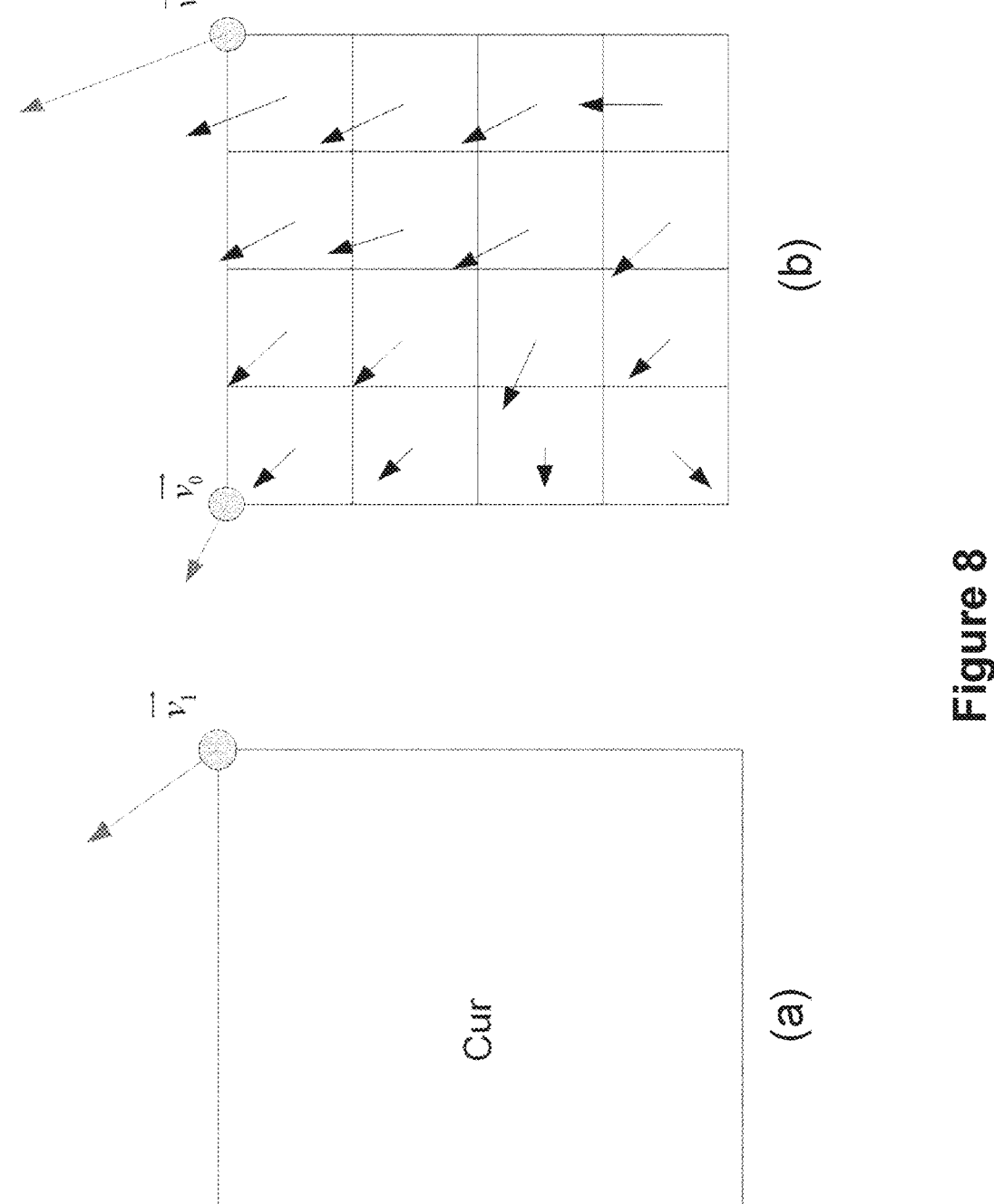
FIGS. 8(a) and (b) illustrate the Affine (SubBlock) mode.

As shown in FIG. 8(*a*), the affine motion field of the block is described by two control point motion vectors.

The affine mode is a motion compensation mode like the Inter modes (AMVP, "classical" Merge, or "classical" Merge Skip). Its principle is to generate one motion information per pixel according to 2 or 3 neighbouring motion information. In the JEM, the affine mode derives one motion information for each 4×4 block as depicted in FIG. 8(*a*) (each square is a 4×4 block, and the whole block in FIG. 8(*a*) is a 16×16 block which is divided into 16 blocks of such square of 4×4 size—each 4×4 square block having a motion vector associated therewith). The Affine mode is available for the AMVP mode and the Merge modes (i.e. the classical Merge mode which is also referred to as "non-Affine Merge mode" and the classical Merge Skip mode which is also referred to as "non-Affine Merge Skip mode"), by enabling the affine mode with a flag.

In the VVC specification the Affine Mode is also known as SubBlock mode; these terms are used interchangeably in this specification.

The subblock Merge mode of VVC contains a subblock-based temporal merging candidates, which inherit the motion vector field of a block in a previous frame pointed by a spatial motion vector candidate. This subblock candidate is followed by inherited affine motion candidate if the neighboring blocks have been coded with an inter affine mode of subblock merge and then some as constructed affine candidates are derived before some zero Mv candidate.

CIIP

In addition to the regular Merge mode and subblock Merge mode, the VVC standard contains also the Combined Inter Merge/Intra prediction (CIIP) also known as Multi-Hypothesis Intra Inter (MHII) Merge mode.

Figure 10:
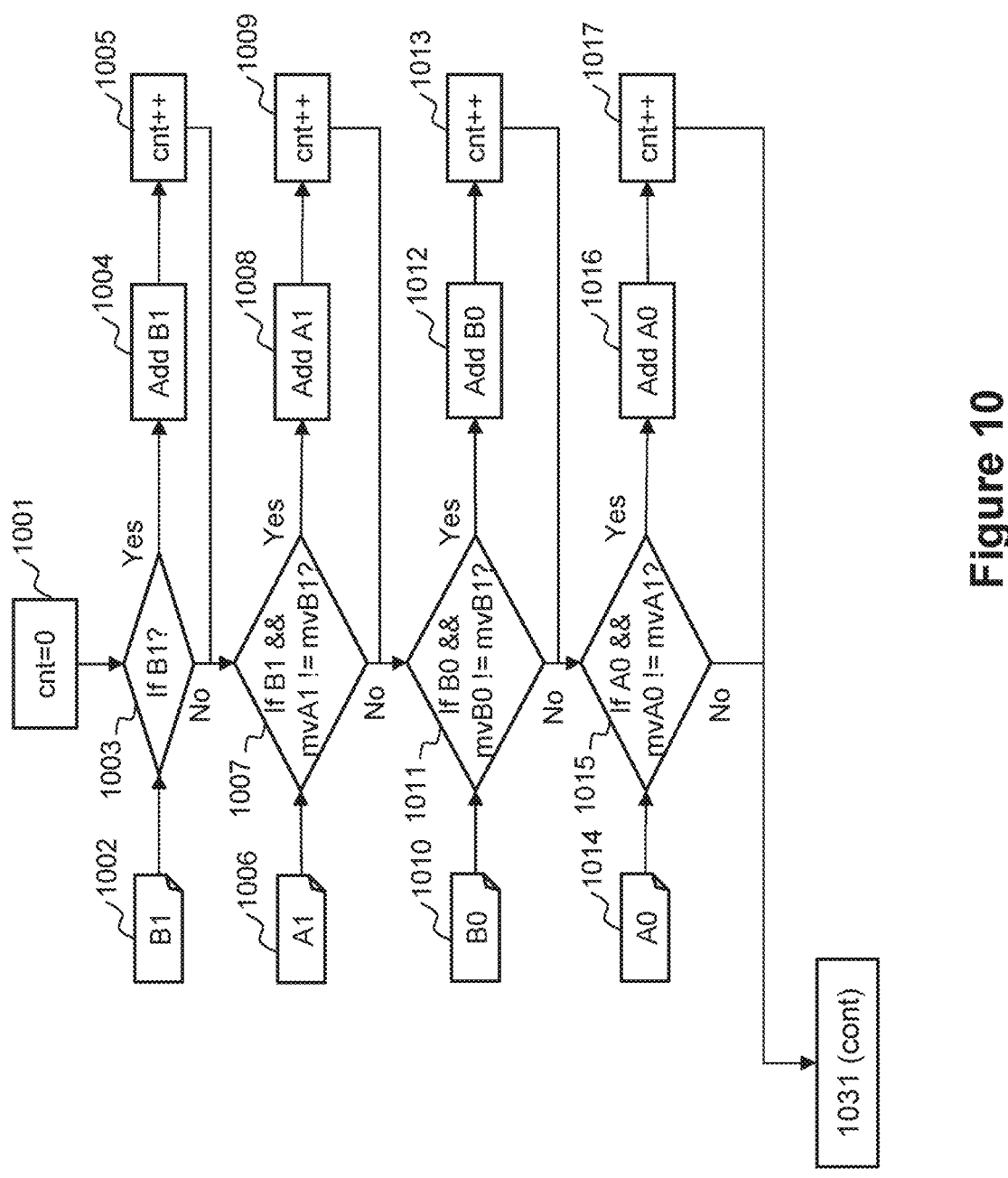
FIG. 10 illustrates the first steps of the Merge candidates list derivation of VVC.
Figure 10:
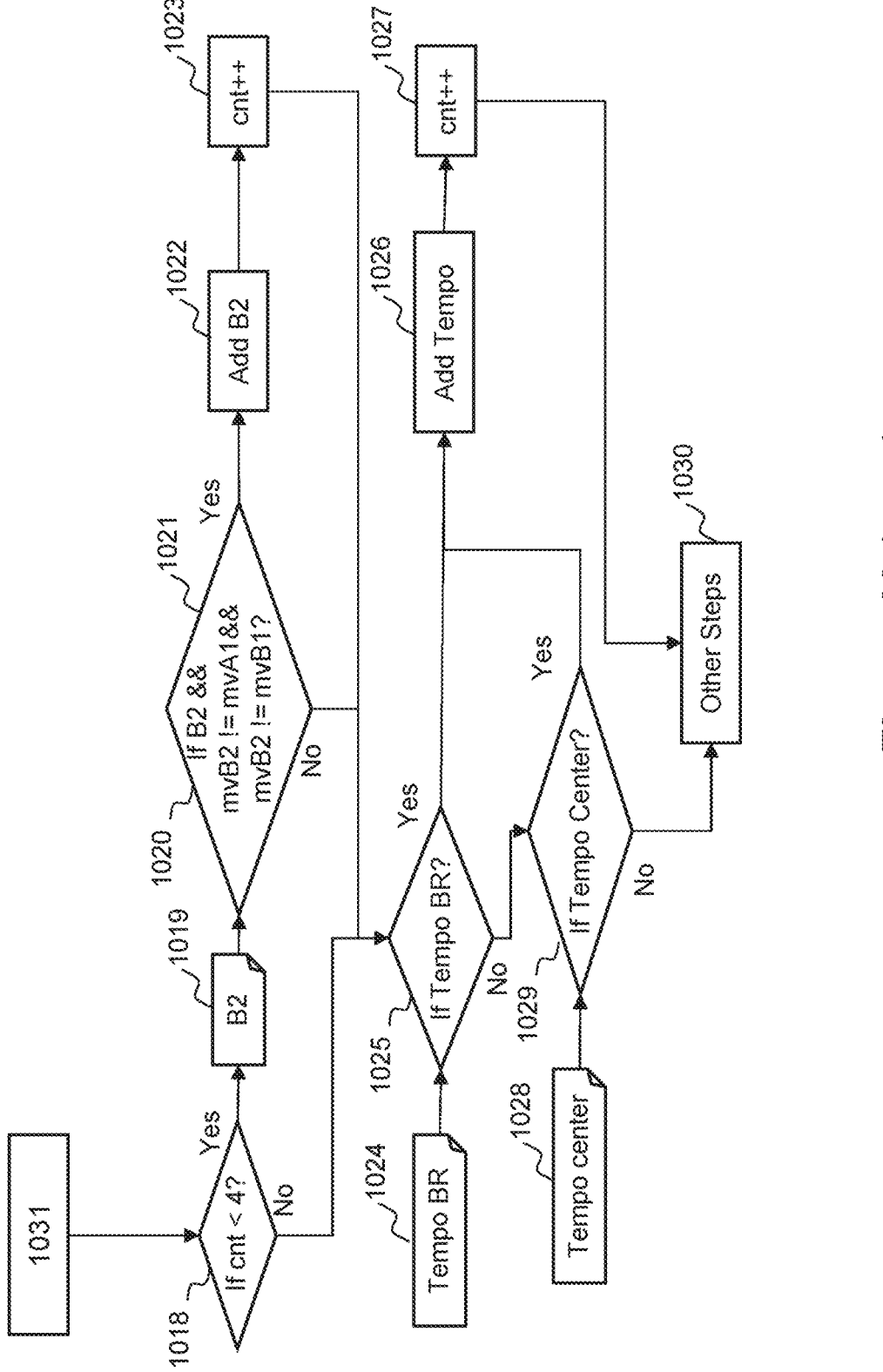

The Combined Inter Merge/Intra prediction (CIIP) Merge can be considered as a combination of the regular Merge mode and the Intra mode and is described below with reference to FIG. 10. The block predictor for the current block (1001) of this mode is an average between a Merge predictor block and an Intra predictor block as depicted in FIG. 10. The Merge predictor block is obtained with exactly the same process of the Merge mode so it is a temporal block (1002) or bi-predictor of 2 temporal blocks. As such, a Merge index is signalled for this mode in the same manner as the regular Merge mode. The Intra predictor block is obtained based on the neighbouring sample (1003) of the current block (1001). The amount of available Intra modes for the current block is however limited compared to an Intra block. Moreover, there is no Chroma Intra predictor block signalled for a CIIP block. The Chroma predictor is equal to the Luma predictor. As a consequence, 1, 2 or 3 bits are used to signal the Intra predictor for a CIIP block.

The CIIP block predictor is obtained by a weighted average of the Merge block predictor and the Intra block predictor. The weighting of the weighted average depends on the block size and/or the Intra predictor block selected.

The obtained CIIP predictor is then added to the residual of the current block to obtain the reconstructed block. It should be noted that the CIIP mode is enabled only for non-Skipped blocks. Indeed, use of the CIIP Skip typically results in losses in compression performance and an increase in encoder complexity. This is because the CIIP mode has often a block residual in opposite to the other Skip mode. Consequently its signalling for the Skip mode increases the bitrate. —when the current CU is Skip, the CIIP is avoided. A consequence of this restriction is that the CIIP block can't have a residual containing only 0 value as it is not possible to encode a VVC block residual equal to 0. Indeed, in VVC the only way to signal a block residual equal to 0 for a Merge mode is to use the Skip mode, this is because the CU CBF flag is inferred to be equal to true for Merge modes. And when this CBF flag is true, the block residual can't be equal to 0.

In such a way, CIIP should be interpreted in this specification as being a mode which combines features of Inter and Intra prediction, and not necessarily as a label given to one specific mode.

The CIIP used the same Motion vector candidates list as the regular Merge mode.

MMVD

The MMVD MERGE mode is a specific regular Merge mode candidate derivation. It can be considered as an independent Merge candidates list. The selected MMVD Merge candidate, for the current CU, is obtained by adding an offset value to one motion vector component (mvx or mvy) to an initial regular Merge candidate. The offset value is added to the motion vector of the first list L0 or to the motion vector of the second list L1 depending on the configuration of these reference frames (both backward, both forward or forward and backward). The initial Merge candidate is signalled thanks to an index. The offset value is signalled thanks to a distance index between the 8 possible distances (¼-pel, ½-pel, 1-pel, 2-pel, 4-pel, 8-pel, 16-pel, 32-pel) and a direction index giving the x or the y axis and the sign of the offset.

In VVC, only the 2 first candidates of the regular Merge list are used for the MMVD derivation and signalling by one flag.

Geometric Partitioning Mode

Figure 9:
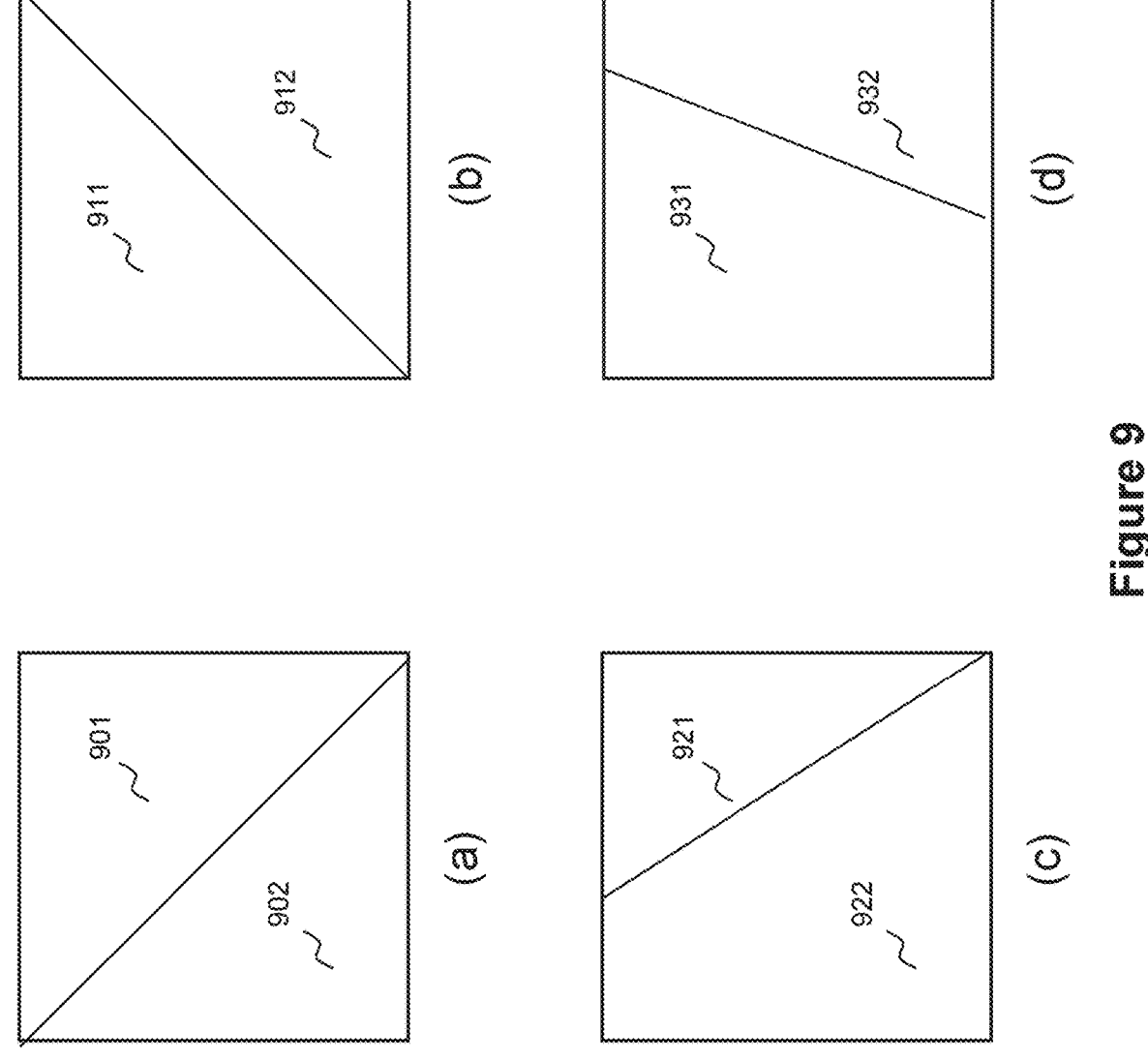
FIGS. 9(a), (b), (c), (d) illustrate the geometric mode.

The Geometric (GEO) MERGE mode is a particular bi-prediction mode. FIG. 9 illustrates this particular block predictor generation. The block predictor contains one triangle from a first block predictor (901 or 911) and a second triangle from a second block predictor (902 or 912). But several other possible splits of the block are possible as depicted in FIG. 9(c) and FIG. 9(d). The Geometric Merge should be interpreted in this specification as being a mode which combines features of two Inter non square predictors, and not necessarily as a label given to one specific mode.

Each partition (901 or 902), in the example of FIG. 9(a), has a motion vector candidate which is a unidirectional candidate. And for each partition an index is signalling to obtain at decoder the corresponding motion vector candidate in a list of unidirectional candidates. And the first and the second can't use the same candidate. This list of candidates comes from the regular Merge candidates list where for each candidate, one of the 2 components (L0 or L1) have been removed.

IBC

In VVC, it is also possible to enable the Intra block Copy (IBC) merge mode. IBC has an independent merge candidate derivation process.

Other Motion Information Improvements

DMVR

The decoder side motion vector derivation (DMVR), in VVC, increases the accuracy of the MVs of the Merge mode. For this method, a bilateral-matching (BM) based decoder side motion vector refinement is applied. In this bi-prediction operation, a refined MV is searched around the initial MVs in the reference pictures list L0 and reference pictures list L1. The BM method calculates the distortion between the two candidate blocks in the reference pictures list L0 and list L1.

The DMVR method has several steps for motion refinement regarding several sub pixel steps or subblock partitioning in ECM. One particularity of the VVC DMVR is that that a first cost is computed between the two initial blocks from L0 and L1. When, the Sum of Absolute Different (SAD) is less than the number of samples of the current block, the refinements steps are not applied. This criterion is fixed and not adaptable.

BDOF

VVC integrates also a bi-directional optical flow (BDOF) tool. BDOF, previously referred to as BIO, is used to refine the bi-prediction sig/nal of a CU at the 4×4 subblock level. BDOF is applied to a CU if it satisfies several conditions, especially if the distances (i.e. Picture Order Count (POC) difference) from two reference pictures to the current picture are the same. As its name indicates, the BDOF mode is based on the optical flow concept, which assumes that the motion of an object is smooth. For each 4×4 subblock, a motion refinement (v_x, v_y) is calculated by minimizing the difference between the L0 and L1 prediction samples. The motion refinement is then used to adjust the bi-predicted sample values in the 4×4 subblock.

PROF

Similarly, Prediction refinement with optical flow (PROF) is used for affine mode.

AMVR and hpelIfIdx

VVC also includes Adaptive Motion Vector Resolution (AMVR). AMVR allows the motion vector difference of the CU to be coded in different precision. For example for AMVP mode: quarter-luma-sample, half-luma-sample, integer-luma-sample or four-luma-sample are considered. The following table of the VVC specification gives the AMVR shift based on different syntax elements.

|  |  | AmvrShift | | |
|---|---|---|---|---|
| amvr_flag | amvr_precision_idx | inter_affine_flag [ x0 ][ y0 ] = = 1 | CuPredMode[ chType ][ x0 ][ y0 ] = = MODE_IBC ) | inter_affine_flag[ x0 ][ y0 ] = =0 && CuPredMode[ chType ][ x0 ][ y0 ] != MODE_IBC |
| 0 | — | 2 (¼ luma sample) | — | 2 (¼ luma sample) |
| 1 | 0 | 0 (¹⁄₁₆ luma sample) | 4 (1 luma sample) | 3 (½ luma sample) |
| 1 | 1 | 4 (1 luma sample) | 6 (4 luma samples) | 4 (1 luma sample) |
| 1 | 2 | — | — | 6 (4 luma samples) |

AMVR can have an impact on the coding of the other modes than those using motion vector differences coding as the different Merge mode. Indeed, for some candidates the parameter hpelIfIdx, which represent an index on the luma interpolation filter for half pel precision, is propagated for some Merge candidate. For AMVP mode, for example, the hpelIfIdx is derived as follows:

$$hpelIfIdx = AmvrShift == 3 \; ? \; 1: 0$$

Bi-Prediction with CU-Level Weight (BCW)

In VVC, the bi-prediction mode with CU-level weight (BCW) is extended beyond simple averaging (as performed in HEVC) to allow weighted averaging of the two prediction signals $P_0$ and $P_1$ according to the following formula.

$$P_{bi-pred} = ((8 - w) * P_0 + w * P_1 + 4) >> 3$$

Five weights are allowed in the weighted averaging bi-prediction, where $w \in \{-2, 3, 4, 5, 10\}$.

For a non-merge CU, the weight index, bcwIndex, is signalled after the motion vector difference.

For a Merge CU, the weight index is inferred from neighbouring blocks based on the merge candidate index.

BCW is used only for CUs with 256 or more luma samples. Moreover, for low-delay pictures, all 5 weights are used. And for non-low-delay pictures, only 3 weights ($w \in \{3, 4, 5\}$) are used.

Regular Merge List Derivation

Figure 11:
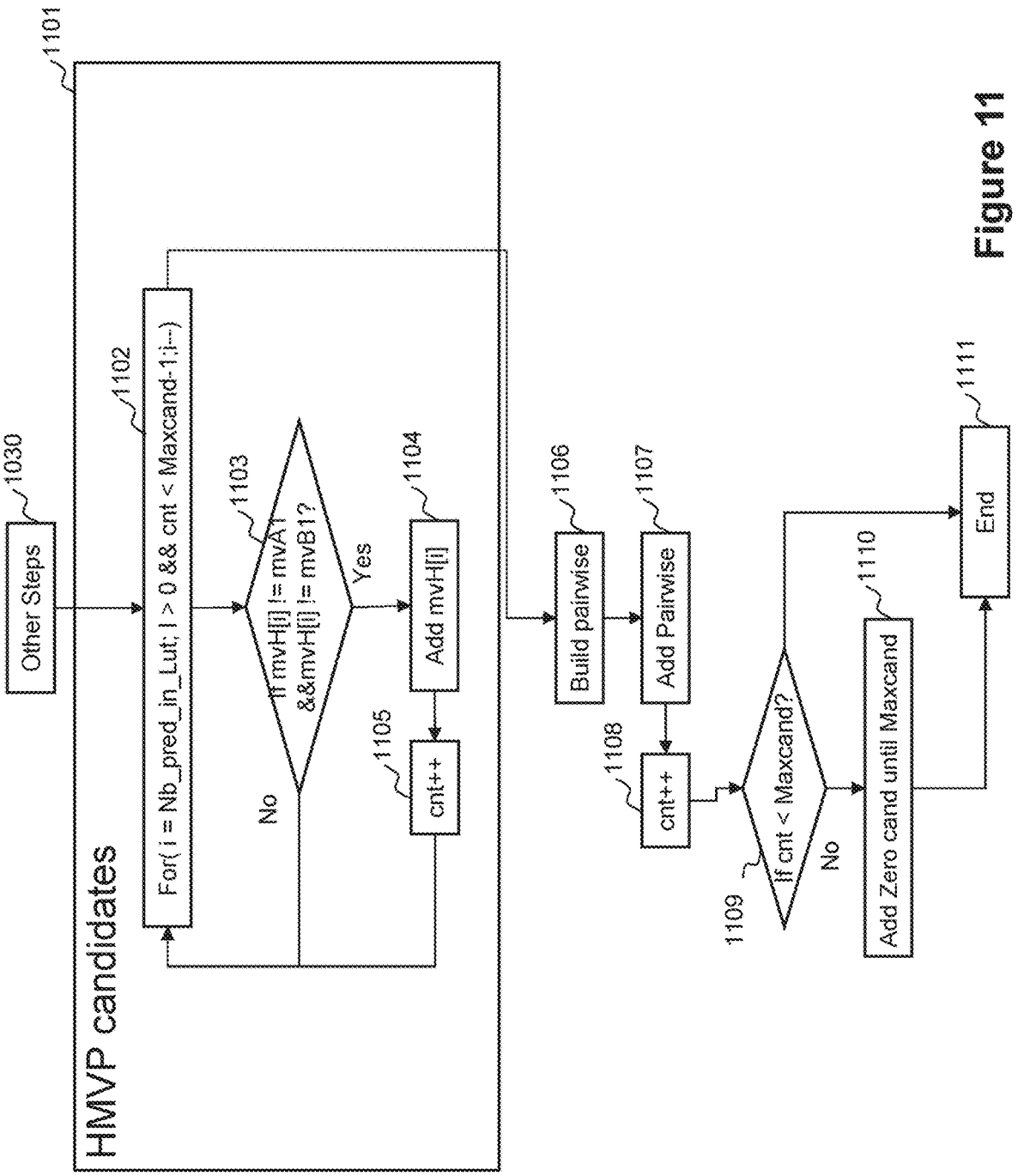
FIG. 11 illustrates further steps of the Merge candidates list derivation of VVC.

In VVC, the regular Merge list is derived as in FIG. 10 and FIG. 11. First the spatial candidates B1 (1002), A1

Figure 7:
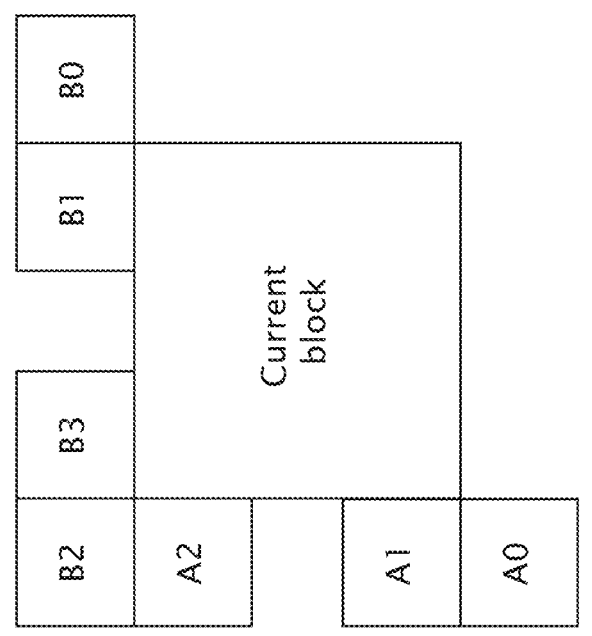

(1006), B0 (1010), A0 (1014) (as depicted in FIG. 7) are added if they exist. And partial redundancy checks are performed, between the motion information of A1 and B1 (1007) to add A1 (1008), between the motion information of B0 and B1 (1011) to add B0 (1012) and between the motion information of A0 and A1 (1015) to add A0 (1016).

When a Merge candidate is added, the variable cnt is incremented (1015, 1009, 1013, 1017, 1023, 1027, 1115, 1108).

If the number of candidates in the list (cnt) is strictly inferior to 4 (1018), the candidate B2 (1019) is added (1022) if it has not the same motion information as A1 and B1 (1021).

Then the temporal candidate is added. The bottom right candidate (1024), if it is available (1025) is added (1026), otherwise the center temporal candidate (1028) is added (1026) if it exists (1029).

Then the history based (HMVP) are added (1101), if they have not the same motion information as A1 and B1 (1103). In addition the number of history based candidates can't exceed the maximum number of candidates minus 1 of the Merge candidates list (1102). So after the history based candidates there is at least one position missing in the merge candidates list.

Then, if the number of candidates in the list is at least 2, the pairwise candidate is built (1106) and added in the Merge candidates list (1107).

Then if there are empty positions (1109) in the Merge candidates list, the zero candidates are added (1110).

For spatial and history-based candidates, the parameters the parameters BCWidx and useAltHpelIf are set equal to the related parameters of the candidates. For temporal and zero candidates they are set equal to the default value, 0. These default values in essence disable the method.

For the pairwise candidate, BCWidx is set equal to 0 and hpelIfIdxp is set equal to the hpelIfIdxp of the first candidate if it is equal to the hpelIfIdxp of the second candidate, and to 0 otherwise.

Pairwise Candidate Derivation

Figure 12:
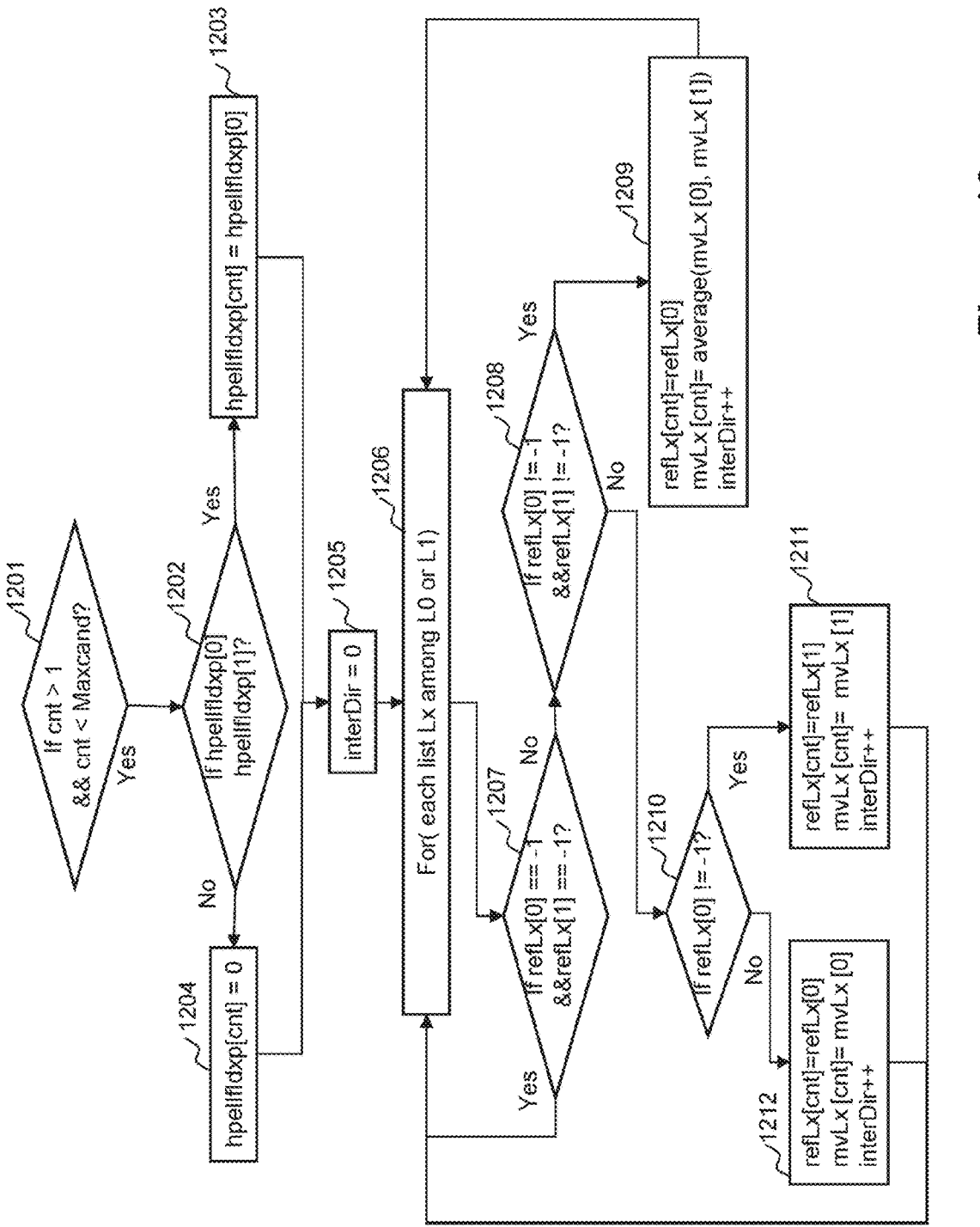
FIG. 12 illustrates the derivation of a pairwise candidate.

The pairwise candidate is built (1106) according to the algorithm of FIG. 12. As depicted, when 2 candidates are in the list (1201), the hpelIfIdxp is derived as mentioned previously (1204, 1202, 1203). Then the inter direction (interDir) is set equal to 0 (1205). For each list, L0 and L1, if at least one reference frame is valid (different to −1) (1207), the parameters will be set. If both are valid (1208), the mv information for this candidate is derived (1209) and set equal to the reference frame of the first candidate and the motion information is the average between the 2 motion vectors for this list and the variable interDir is incremented. If only one of the candidates has motion information for this list (1210), the motion information for the pairwise candidate is set equal to this candidate (1212, 1211) and the inter direction variable interDir is incremented.

ECM

Since the end of the standardization of VVC v1, JVET has launched an exploration phase by establishing an exploration software (ECM). It gathers additional tools and improvements of existing tools on top of the VVC standard to target better coding efficiency. The different additional tools compared to VVC are described in JVET-X2025.

ECM Merge Modes

Among all tools added, some additional Merge modes have been added. The Affine MMVD signal offsets for the Merge affine candidate as the MVVD coding for the regular Merge mode. Similarly, the GEO MMVD was also added.

not the adjacent ones, as the adjacent are the spatial candidates. They are selected according to a distance and a direction. As for the history based the list of adjacent candidates can be added until that the list reaches the maximum number of candidate minus 1, in order that the pairwise can still be added.

Zero Candidates

If the list still hasn't reached the maximum number of candidates (Maxcand) zero candidates are added to the list. The zero candidates are added according to the possible reference frames or pair of reference frames. The following pseudo code gives the derivation of such candidates:

```
int iNumRefIdx =slice.isInterB( )?min(MaxRefL0, MaxRefL1): MaxRefL0;
int r=0
int refcnt=0;
while (nbCand < Maxcand)
  {
    if (slice.isInterB( ))
    {
      addZero(L0(Mv(0,0),Refix(r)), L1(Mv(0,0),Refix(r)) );
    }
    else
    {
      addZero(Mv(0,0),Refix(r));
    }
    nbCand++;
    if (refcnt == iNumRefIdx – 1)
    {
      r = 0;
    }
    else
    {
      ++r;
      ++refcnt;
    }
  }
```

35

The CIIP PDPC is an extension of the CIIP. And 2 template matching Merge modes have been added: the regular template matching and the GEO template matching.

Figure 13:
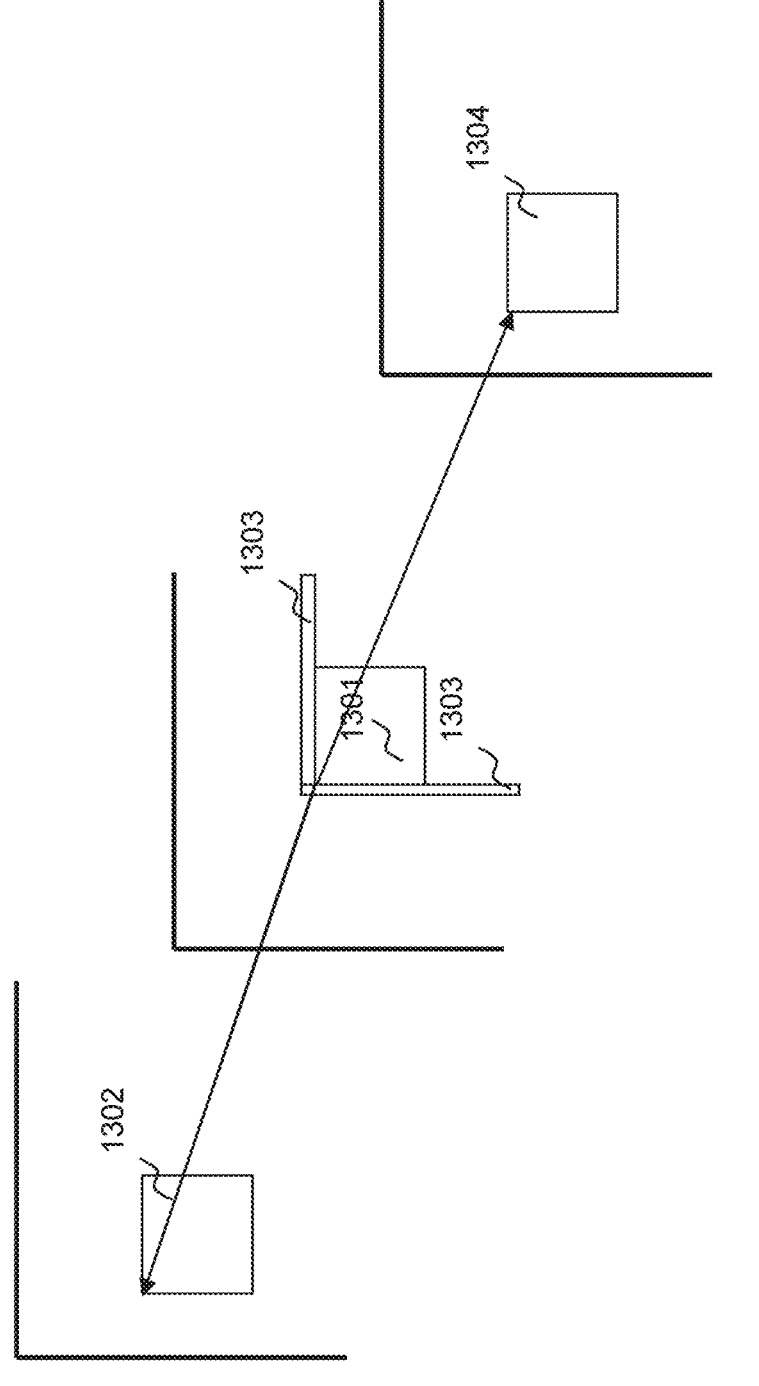
FIG. 13 illustrates the template matching method based on neighbouring samples.

The regular template matching is based on the template matching estimation as depicted in FIG. 13. At decoder side, for the candidate corresponding to the related Merge index and for both lists (L0, L1) available, a motion estimation based on the neighboring samples of the current block (1301) and based on the neighboring samples of the multiple corresponding block positions, a cost is computed and the motion information which minimized the cost is selected. The motion estimation is limited by a search range and several restrictions on this search range are also used to reduce the complexity.

In the ECM, the regular template matching candidates list is based on the regular Merge list but some additional steps and parameters have been added which means different Merge candidates lists for a same block may be generated. Moreover, only 4 candidates are available for the template matching regular Merge candidates list compared to the 10 candidates for the regular Merge candidates list in the ECM with common tests conditions defined by JVET.

Regular Merge List Derivation in ECM

Figure 14:
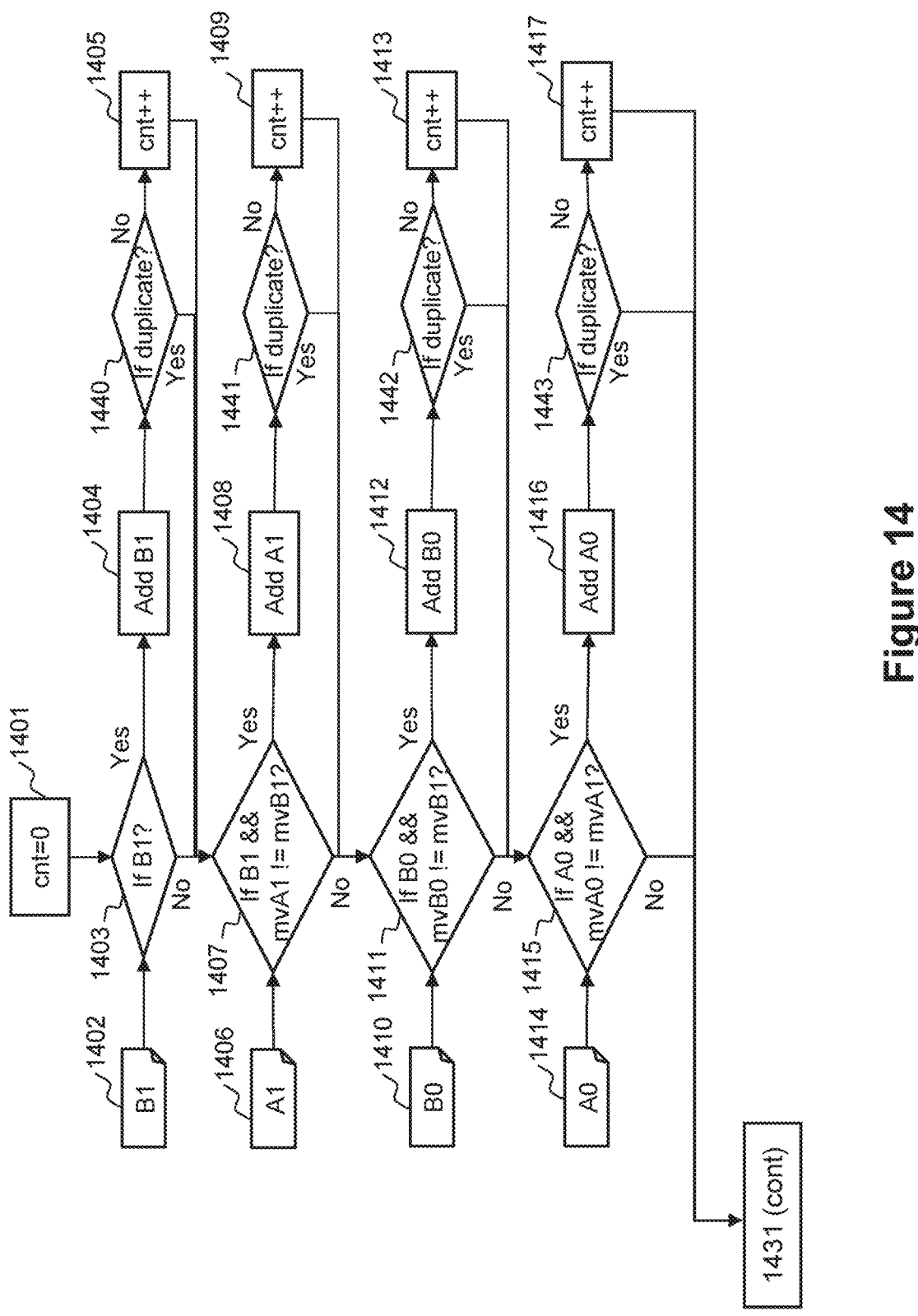
FIG. 14 illustrates a modification of the first steps of the Merge candidates list derivation shown in FIG. 10.
Figure 14:
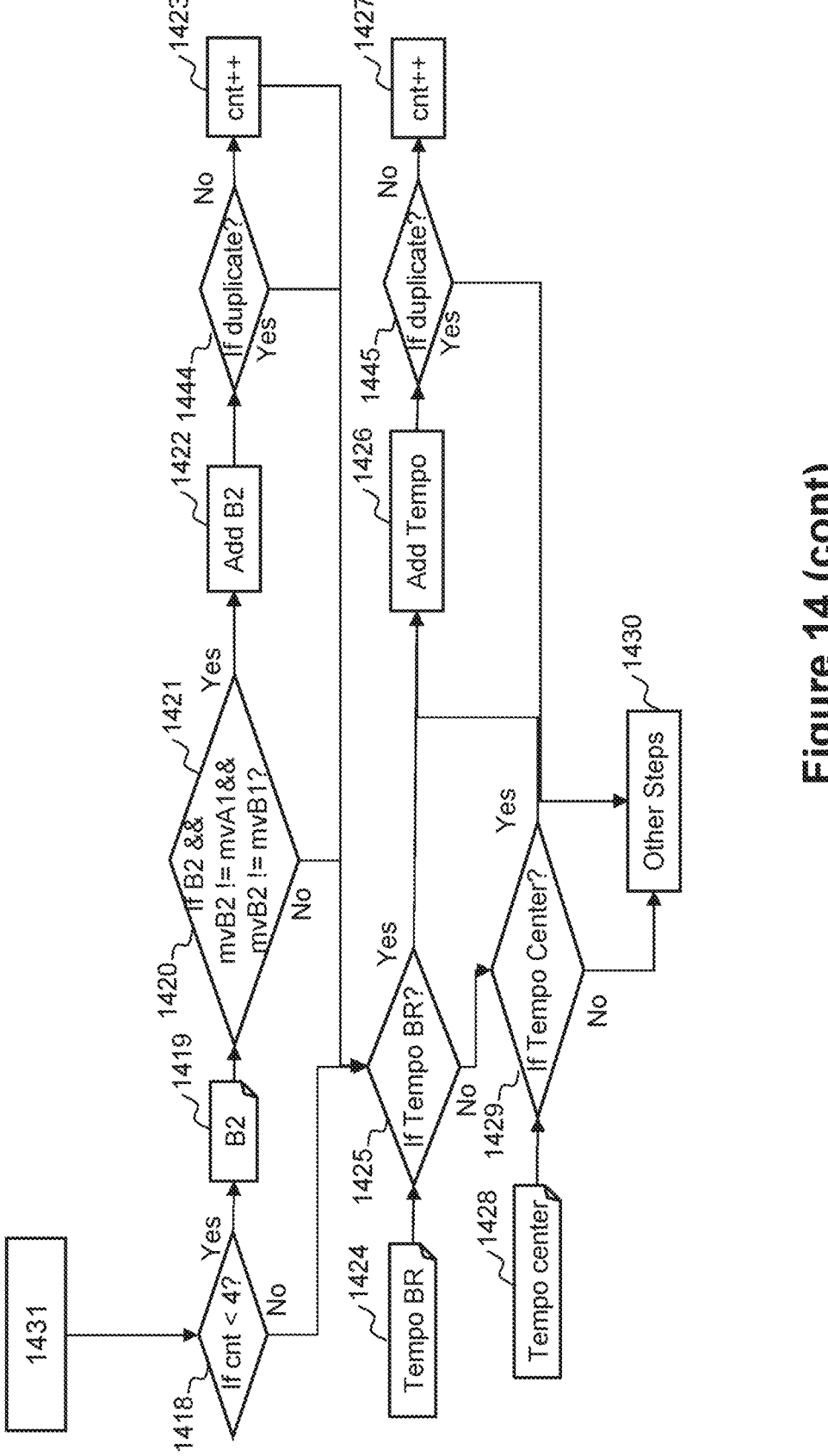
Figure 15:
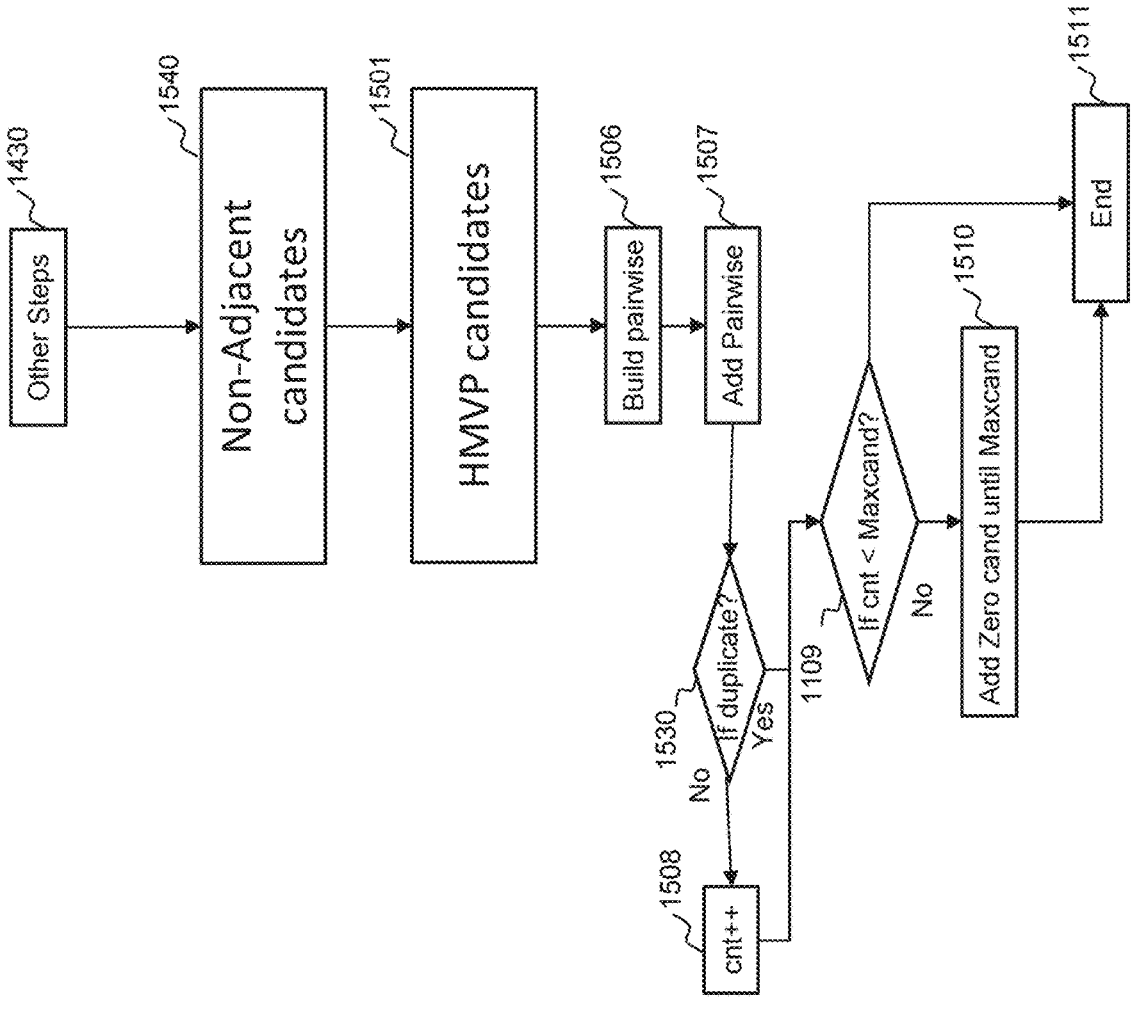
FIG. 15 illustrates a modification of the further steps of the Merge candidates list derivation shown in FIG. 11.

In the ECM, the regular Merge list derivation have been updated. FIGS. 14 and 15 show this update based on respectively FIGS. 10 and 11. But for clarity, the module for the history based candidates (1101) have been summarized in (1501).

In this FIG. 15, a new type of merge candidates has been added: the non-adjacent candidates (1540). These candidates come from blocks spatially located in the current frame but This pseudo code can be summarized as: for each reference frame index (uni-direction), or pair of reference indexes (bi-prediction), a zero candidate is added. When all are added, only zero candidates with reference frames indexes 0 are added until that the number of candidates reaches its maximum value. In such a way, the Merge list can include multiple zero candidates. Indeed, it has been surprisingly found that this occurs frequently in real video sequences, particularly at the beginnings of slices or frames and sequences.

In the recent modification of the derivation of the merge candidates, the number of the candidates in the list can be greater than the maximum number of candidates in the final list Maxcand. Yet this number of candidates in the initial list, MaxCandInitialList, is used for the derivation. Consequently, the Zero candidates are added until the number of candidates is MaxCandInitialList and not until it is Maxcand.

BM Merge Mode

The BM Merge is Merge mode dedicated to the Adaptive decoder side motion vector refinement method which is an extension of multi-pass DMVR of the ECM. As described in JVET-X2025, this mode is equivalent to 2 Merge modes to refine the MV only in one direction. So, one Merge mode for L0 and one Merge mode for L1. So, the BM Merge is enabled only when the DMVR conditions can be enabled. For these two Merge modes only one list of Merge candidates is derived and all candidates respect the DMVR conditions.

The Merge candidates for the BM Merge mode are derived from spatial neighbouring coded blocks, TMVPs, non-adjacent blocks, HMVPs, pair-wise candidate, in a similar manner as for the regular Merge mode. A difference is that only those meet DMVR conditions are added into the candidate. Merge index is coded in a similar manner as for regular Merge mode.

AMVP Merge Mode

The AVMP Merge mode, also known as the bi-directional predictor, is defined as the following in JVET-X2025: It is composed of an AMVP predictor in one direction and a Merge predictor in the other direction. The mode can be enabled to a coding block when the selected Merge predictor and the AMVP predictor satisfy DMVR condition, where there is at least one reference picture from the past and one reference picture from the future relatively to the current picture and the distances from two reference pictures to the current picture are the same, the bilateral matching MV refinement is applied for the Merge MV candidate and AMVP MVP as a starting point. Otherwise, if template matching functionality is enabled, template matching MV refinement is applied to the Merge predictor or the AMVP predictor which has a higher template matching cost.

AMVP part of the mode is signalled as a regular uni-directional AMVP, i.e. reference index and MVD are signalled, and it has a derived MVP index if template matching is used or MVP index is signalled when template matching is disabled.

For AMVP direction LX, where X can be 0 or 1, the Merge part in the other direction (1-LX) is implicitly derived by minimizing the bilateral matching cost between the AMVP predictor and a Merge predictor, i.e. for a pair of the AMVP and a Merge motion vectors. For every Merge candidate in the Merge candidate list which has that other direction (1-LX) motion vector, the bilateral matching cost is calculated using the Merge candidate MV and the AMVP MV. The Merge candidate with the smallest cost is selected. The bilateral matching refinement is applied to the coding block with the selected Merge candidate MV and the AMVP MV as a starting point.

The third pass of multi pass DMVR which is 8×8 sub-PU BDOF refinement of the multi-pass DMVR is enabled to AMVP-merge mode coded block.

The mode is indicated by a flag, if the mode is enabled AMVP direction LX is further indicated by a flag.

MVD Sign Prediction

The sign prediction method is described in JVET-X0132. The motion vector difference sign prediction can be applied in regular inter modes if the motion vector difference contains non-zero component. In the current ECM version, it is applied for AMVP, Affine MVD and SMVD modes. Possible MVD sign combinations are sorted according to template matching cost and index corresponding to the true MVD sign is derived and coded with context model. At decoder side, the MVD signs are derived as following: 1/Parse the magnitude of MVD components. 2/Parse context-coded MVD sign prediction index. 3/Build MV candidates by creating combination between possible signs and absolute MVD value and add it to the MV predictor. 4/Derive MVD sign prediction cost for each derived MV based on template matching cost and sort. 5/Use MVD sign prediction index to pick the true MVD sign. 6/Add the true MVD to the MV predictor for final MV.

TIMD

The intra prediction, fusion for template-based intra mode derivation (TIMD) is described as the following in JVET-X2025: For each intra prediction mode in MPMs, The SATD between the prediction and reconstruction samples of the template is calculated. First two intra prediction modes with the minimum SATD are selected as the TIMD modes. These two TIMD modes are fused with the weights after applying PDPC process, and such weighted intra prediction is used to code the current CU. Position dependent intra prediction combination (PDPC) is included in the derivation of the TIMD modes.

Duplicate Check

In FIGS. 14 and 15, a duplicate check for each candidate was added (1440, 1441, 1442, 1443, 1444, 1445, and 1530). But, the duplicate is also for the Non-adjacent candidates (1540) and for the history based candidates (1501). It consists in comparing the motion information of the current candidate of the index cnt to the motion information of each other previous candidates. When this motion information is equal, it is considered as duplicate and the variable cnt is not incremented. Of course the motion information means inter direction, reference frame indexes and motion vectors for each list (L0, L1). Note that zero candidates corresponding to different reference frames are not considered duplicates.

MVTH

In the ECM, for the duplicate check a motion vector threshold was introduced. This parameter changes the equality check by considering that 2 motion vectors are equal if their absolute difference, for each component, is in less than or equal to the motion vector threshold MvTh. For the regular Merge mode the MvTh is set equal to 1 which corresponds to a traditional duplicate check without motion vector threshold.

The MvTh is equal to a value which depends on the number of luma sample nbSamples in the current CU for the template matching regular Merge mode as defined as the following:

```
if (nbSamples < 64) MvTh = 1<< MV_FRACTIONAL =16
else if (nbSamples < 256) MvTh = 2<< MV_FRACTIONAL =32
else MvTh = 4<< MV_FRACTIONAL =64
```

Where MV_FRACTIONAL corresponds to the inter resolution of the codec. So, in ECM currently, the $16^{th}$ resolution is used so MV_FRACTIONAL is equal to 4. << is the left shift operator. And where nbSamples=Height×Width (i.e. Height and Width for the current block).

There is, for example, another threshold, MvThBDMVRMvdThreshold, used for GEO Merge derivation and also for the duplicate check of the non-adjacent candidates as described below.

```
if (nbSamples < 64)
    MvThBDMVRMvdThreshold = (1 << MV_FRACTIONAL) >> 2 = 4
else if (nbSamples < 256)
    MvThBDMVRMvdThreshold = (1 << MV_FRACTIONAL) >> 1 = 8
else
    MvThBDMVRMvdThreshold = (1 << MV_FRACTIONAL) >> 0 = 16
```

ARMC

In the ECM, in order to reduce the number of bits for the Merge index, an Adaptive Reordering of Merge Candidates with Template Matching (ARMC) was added. According to the template matching cost computed as in FIG. 13, the candidates are reordered based on the cost of each candidate. In this method only one cost is computed per candidate. This method is applied after that this list has been derived and only on the 5 first candidates of the regular Merge candidates list. It should be appreciated that the number 5 was chosen to balance the complexity of the reordering process with the potential gains, and as such a greater number (e.g. all of the candidates) may be reordered.

Figure 18:
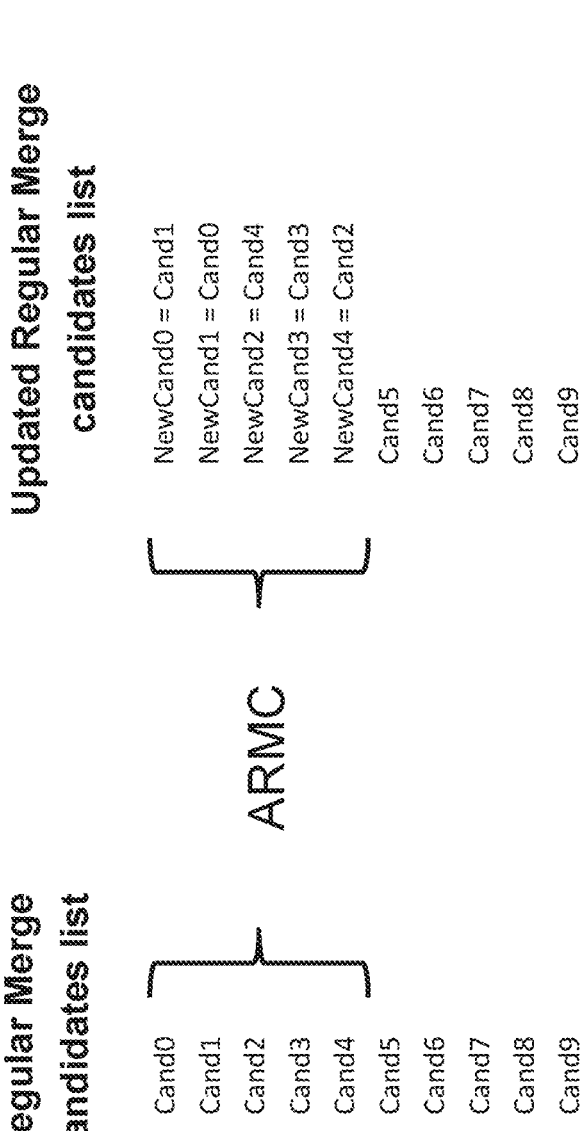
FIG. 18 illustrates the reordering process of the list of Merge mode candidates.

FIG. 18 gives an example of this method applied to a regular Merge candidate list containing 10 candidates as in the CTC.

This method is also applied to the subblock merge mode except for the temporal candidate and for the regular TM mode for all of the 4 candidates.

In a proposal, this method was also extended to reorder and select a candidate to be included in the final list of Merge mode candidates. For example, in JVET-X0087, all possible non-adjacent candidates (1540) and History based candidates (1501) are considered with temporal non-adjacent candidates in order to obtain a list of candidates. This list of candidates is built without considering the maximum number of candidates. This list candidates is then reordered. Only a correct number of candidates from this list are added to the final list of Merge candidates. The correct number of candidates corresponding to the first N candidates in the list. In this example, the correct number is the maximum number of candidates minus the number of spatial and temporal candidates already in the final list. In other words, the non-adjacent candidates and History based candidates are processed separately from the adjacent spatial and temporal candidates. The processed list is used to supplement the adjacent spatial and temporal Merge candidates already present in the Merge candidate list to generate a final Merge candidate list.

In JVET-X0091, ARMC is used to select the temporal candidate from among 3 temporal candidates bi-dir, L0 or L1. The selected candidate is added to the Merge candidate list.

In JVET-X0133, the Merge temporal candidate is selected from among several temporal candidates which are reordered using ARMC. In the same way, all possible Adjacent candidates are subject to ARMC and up to 9 of these candidates can be added to the list of Merge candidates.

All these proposed methods use the classical ARMC reordering the final list of merge candidates to reorder it. JVET X0087 re-uses the cost computed during the reordering of the non-adjacent and History based candidates, to avoid additional computation costs. JVET-X0133 applies a systematic reordering on all candidates on the final list of merge candidates.

New ARMC

Since the first implementation of ARMC, the method was added to several other modes. The ARMC is applied additionally to the Regular, and Template matching Merge mode, Subblock Merge modes and also for IBC, MMVD, Affine MMVD, CIIP, CIIP with template matching and BM Merge mode. In addition, the principle of ARMC to reorder the list of candidates based on template matching cost is also applied to the AMVP Merge candidates derivation as well as for the Intra method TIMD to select the most probable predictors.

In addition, the principle is added for the sign residual prediction method for Affine MVD, AMVP and SMVD method.

There are also additional tests of the usage of this reordering for GEO Merge mode and GEO with template matching as well as for reference frame index prediction.

In addition to this almost systematic usage of the ARMC, there was several additional modifications of the derivation process for some candidates.

Figure 19:
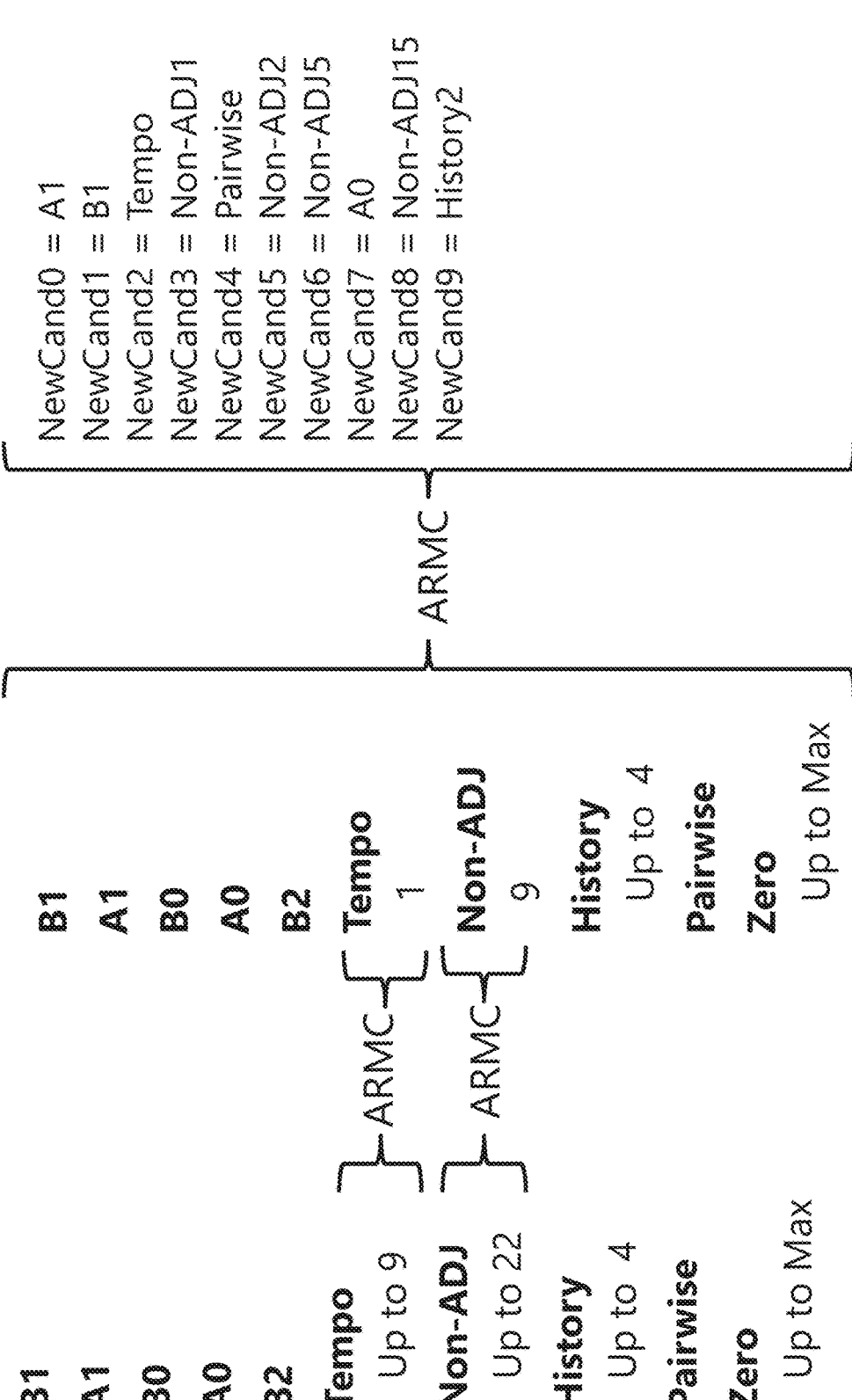
FIG. 19 illustrates the pairwise candidate derivation during the reordering process of the list of Merge mode candidates.

For example, the ECM4.0 derivation includes a cascading ARMC process for the candidates derivation of the regular, TM and BM merge modes as depicted for the regular and TM Merge mode in FIG. 19.

Compared to the previous Merge candidates derivation, firstly, 10 temporal positions are checked and added to the list of the temporal candidates after a non-duplicate check. This temporal list can contain a maximum of 9 candidates. Moreover, there is a particular threshold for this temporal list as the MV threshold is always 1 and not depend on the Merge mode compared to the motion threshold used for the Merge candidate derivation. Based on the list of maximum 9 first non-duplicate positions, the ARMC process is applied and only the first temporal candidate is added in the traditional list of Merge candidates if it is not duplicate compared to previous candidates.

In the same way the non-Adjacent spatial candidates are derived among 59 positions. The first list of non-duplicate candidates which can reach 18 candidates is derived. But the Motion Threshold is different to those used in for temporal derivation and for the rest of the list and doesn't depends on the regular or template Merge modes. It is set equal to the mv the of BDMVR. Up to 18 non-adjacent candidates are reordered and only the 9 first non-Adjacent candidate are kept and added in the Merge candidates list. Then the other candidates are added except if the list contain already the maximum number of candidates. In addition, for the TM Merge mode the maximum number of candidates in the list MaxCandInitialList is higher than the maximum number of candidates that the final list can contain Maxcand.

Then the ARMC process is applied for all candidates of the intermediate list, containing MaxCandInitialList, as depicted in FIG. 19. The maximum number of candidates Maxcand are set in the final list of candidates.

A similar modification is applied also for the BM Merge mode as the template matching Merge mode.

ARMC Template Cost Algorithm

Figure 17:
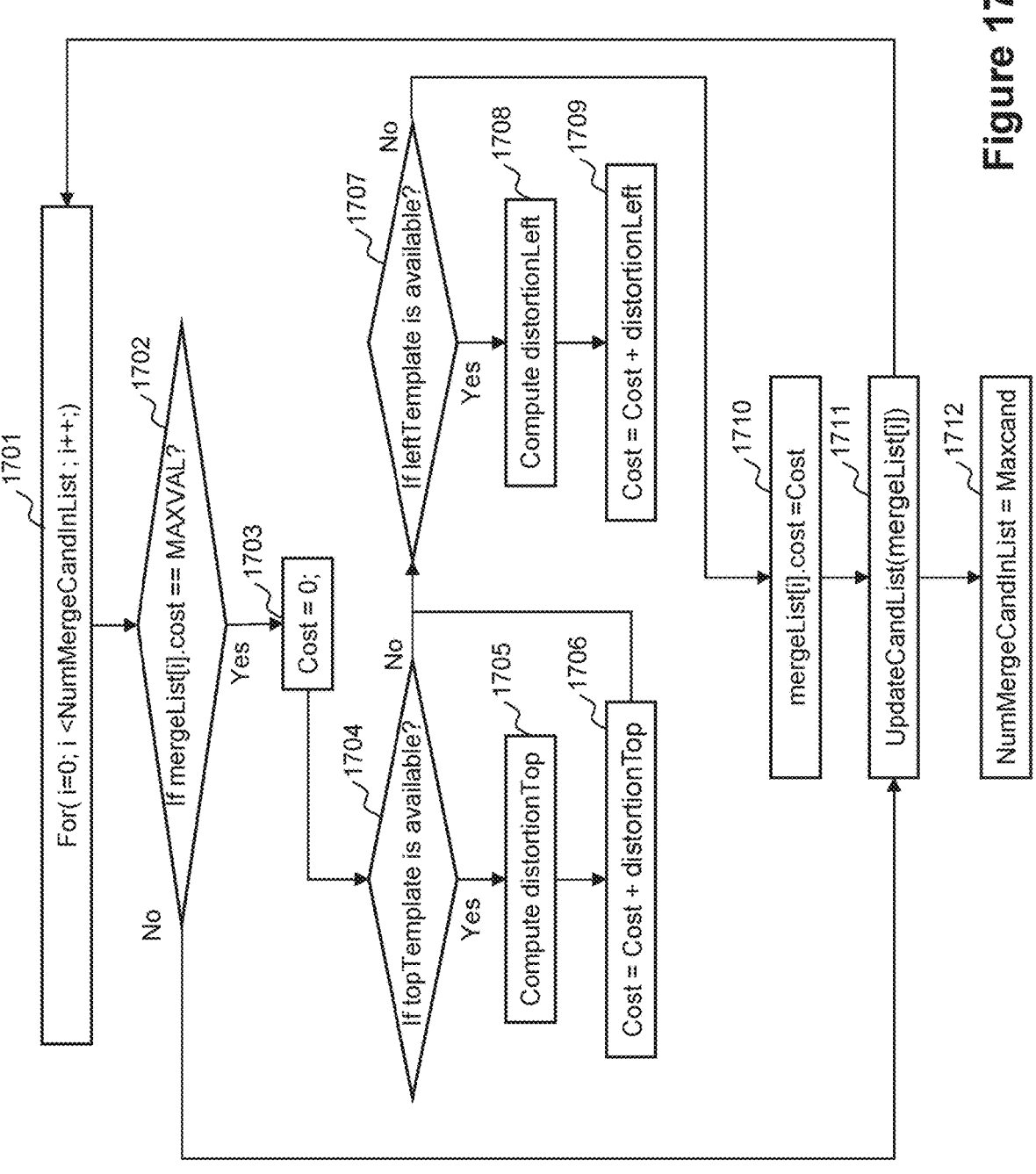
FIG. 17 illustrates the costs determination of a list candidates.

FIG. 17 illustrates the template cost computation of the ARMC method. The number of candidates considered in this process, NumMergeCandInList, is greater than or equal to the maximum number that the list can contain Maxcand (1712).

For each candidate in the list (1701), if the cost was not computed during the first ARMC processes for temporal and non-adjacent candidates (1702), the cost is set equal to 0 (1703). In the implementation a cost non computed associated to a candidate "i", mergeList[i].cost, was set equal to the maximum value MAXVAL. If the top template for the current block is available (1704), the distortion compared to the current block template is computed (1705) and added to the current cost (1706). Then or otherwise, if the left template for the current block is available (1707), the distortion compared the current block template is computed (1708) and added to the current cost (1709). Then the cost of the current Merge candidate, mergeList [i].cost, is set equal to the computed cost (1710) and the list is updated (1711). In this example we consider that the current candidate i is set to a position regarding its cost compared to the cost of the other candidates. When all candidates have been proceeded the number of candidates in the list, NumMerge-CandInList, is set equal to the maximum number of possible candidates in the list Maxcand.

Figure 20:
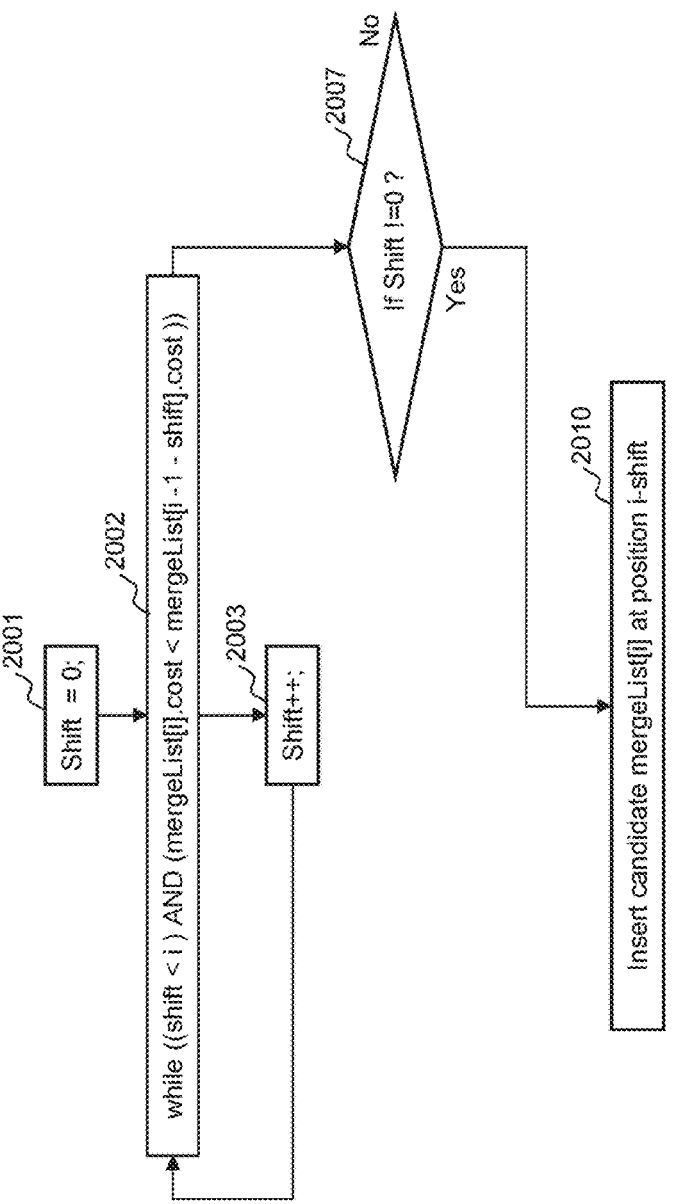
FIG. 20 illustrates the ordering process of predictors based on distortion values.

FIG. 20 shows an illustration of the update of candidate list (1710) of FIG. 17. First a variable Shift is set equal to 0. Then while the Shift is less than to the current candidate i of the FIG. 17 and that the related cost of the current candidate is less than the cost of the previous candidate number i−1-shift, (2002) the variable shift is incremented (2003). When this loop is finished and if the variable shift is different to 0 (2007), a candidate number i is inserted at the position i-shift (2010).

Multiple Hypothesis Prediction (MHP)

The Multiple Hypothesis Prediction (MHP) was also added in the ECM. With this method it is possible to use up to four motion-compensated prediction signals per block (instead of two, as in VVC). These individual prediction signals are superimposed in order to form the overall prediction signal. The motion parameters of each additional prediction hypothesis can be signalled either explicitly by specifying the reference index, the motion vector predictor index, and the motion vector difference, or implicitly by specifying a Merge index. A separate multi-hypothesis Merge flag distinguishes between these two signalling modes.

For spatial candidates, non-adjacent Merge candidates and history based Merge candidates, the multiple hypothesis parameters values 'addHypNeighbours' are inherited from the candidate.

For temporal candidates, and zero candidate and pairwise candidate, the multiple hypothesis parameters values 'add-HypNeighbours' are not kept (they are clear).

LIC

In the ECM, the Local Illumination Compensation (LIC) have been added. It is based on a linear model for illumination changes. The linear model is computed thanks to neighboring samples of the current block and the neighboring samples of the previous blocks.

In the ECM, LIC is enabled only for unidirectional prediction. LIC is signaled by way of a flag. For the Merge modes no LIC flag is transmitted but instead the LIC flag is inherited from the merge candidates in the following manner.

For spatial candidates, Non-adjacent merge candidates and history-based Merge candidates the value of the LIC flag is inherited.

For temporal candidates, and zero candidates the LIC flag is set equal to 0.

Figure 16:
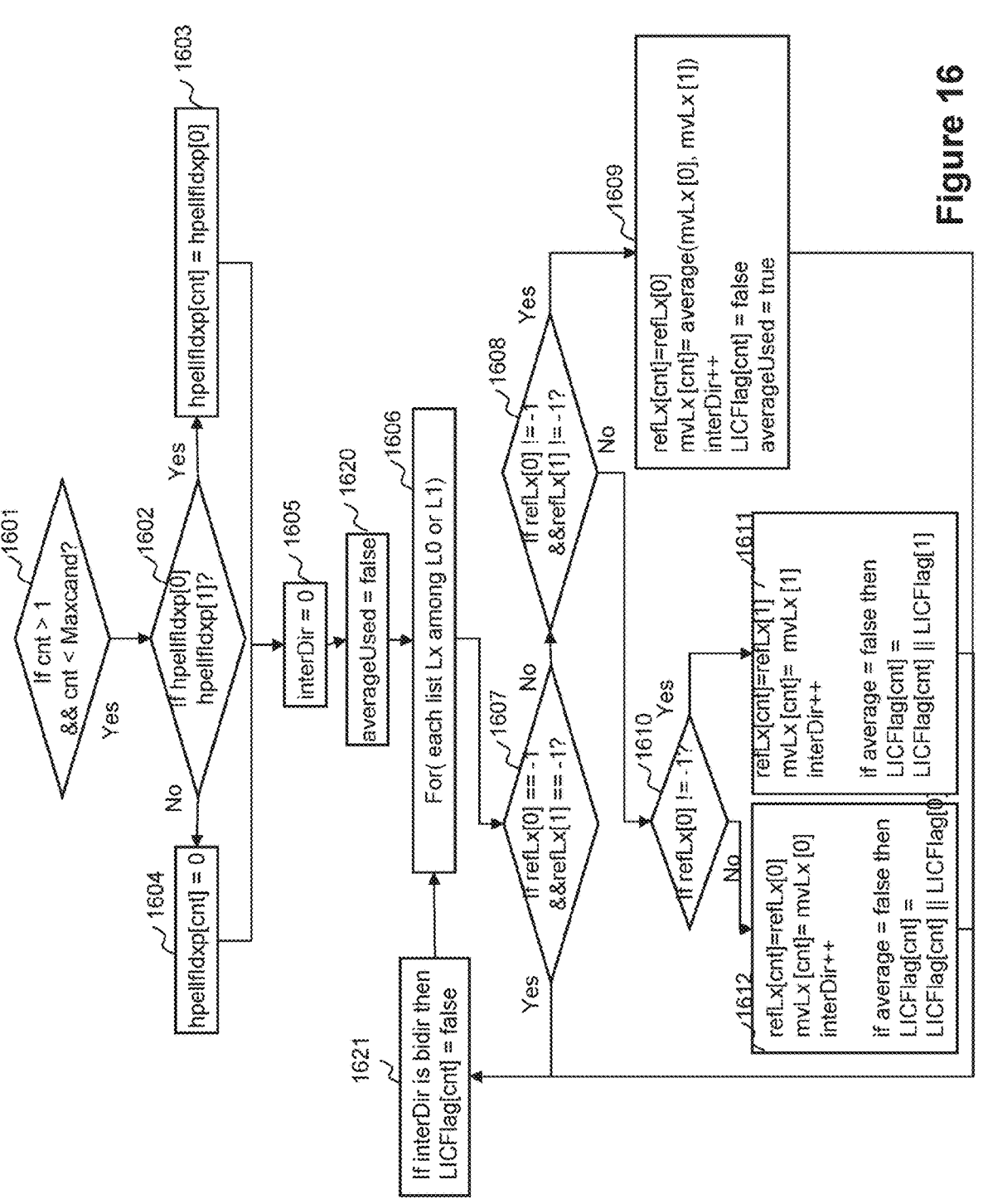
FIG. 16 illustrates a modification of the derivation of a pairwise candidate shown in FIG. 12.

For pairwise candidates, the value of the LIC flag it is set as depicted in FIG. 16. This figure is based on FIG. 12 and modules 1620 and 1621 have been added and modules 1609, 1612 and 1611 have been updated. A variable average is set equal to false (1620), if for the current list the average for the pairwise have been computed the LIC flag for the pairwise LICFlag[cnt] is set equal to false and the variable averageUsed equals to true (1609). If only candidate have a motion information for the list (1612 1611) the LIC flag is updated if the average wasn't used. And it is set equal to a OR operation with its current value and the value of the LICflag of the candidate.

And when the pairwise candidate is Bidir (e.g. equal 3) the LIC flag is equal to false.

However, the algorithm as shown in FIG. 16 only allows the LICflag to be equal to something different to true if the 2 candidates have motion information for one list and each candidate has its own list. For example, the candidate 0 has motion information for L0 only and Candidate 1 has motion information for L1 only. In that case the LIC flag can be equal to something else different to 0 but as LIC is only for uni-direction it will never happen. So the LIC flag for the pairwise is always equal to false. Consequently the pairwise candidate can't use LIC when it is potentially needed. So this reduces the efficiency of the candidate and avoid the propagation of LIC for the following coded blocks and consequently decreases the coding efficiency.

Furthermore, the duplicate check in the ECM software introduces some inefficiencies. As depicted in FIG. 14 and FIG. 15, each candidate is added in the list and the duplicate check (1440, 1441, 1442, 1443, 1444, 1445, and 1530) has an impact only on the increment of the variable cnt (1405, 1409, 1413, 1417, 1423, 1427, 1508). In addition, as described in FIG. 16, the variable BCWidx is not initialized for the pairwise candidate. Consequently, if the last candidate added in the list was a duplicate candidate, the value BCWidx for the pairwise candidate is the value of this previous duplicate candidate. This was not the case in VVC as candidates are not added when they are considered as duplicate.

Problems

One perspective to increase the coding efficiency of image or video compression is to use decoder side decisions to reduce the rate related to the signaling. Some recent video coding standards contain already such technology as DMVR.

To take a decision, an encoder uses several parameters which may influence this decision and takes the best one according to these parameters. At decoder side, the decision should be also adapted based on several parameters. One solution is to define the same rule for all decoders and parameters. But this is not efficient in term of coding efficiency and is not adaptable for all encoder implementations. At the other end of the scale, signaling of all the parameters needed to take a decision results in an increased bitrate which also impact the coding efficiency (particularly for short sequences or when these parameters regularly change).

This invention aims to solve or ameliorate at least some of these problems by an efficient signaling of some parameters needed to take a decision at decoder side.

EMBODIMENTS

In one example, an information representing a threshold needed to take a decoder-side decision is transmitted in the bitstream in at least one header. For example, the threshold can be transmitted at sequence level inside an SPS or for some pictures inside a PPS or for a picture inside a picture header or for a slice or a tile inside a slice header. In such a case the bitstream comprises at least one header comprising syntax elements relating to a threshold value to be used when making decoder side decisions. The threshold value could be explicitly signaled, or derived, as will be discussed in detail below. In other words, a header comprises a syntax element which enables a threshold to be derived, and this threshold is used to determine a criterion used in a decoding process (such as a rate-distortion criterion)

The advantage of this example is an increased flexibility to take decisions at decoder side which increases the coding efficiency thanks to an adaptable threshold.

Transmitting a Threshold Inside at Least One Header.

In one implementation, a syntax element indicates the transmission of the related threshold inside one header. For example, this syntax element is a flag sps_Th_tool1_in_sps transmitted in the SPS. Alternatively, or additionally the syntax element can be pps_Th_tool1_in pps transmitted in the PPS. Alternatively, or additionally the syntax element can be ph_Th_tool1_in_ph transmitted in the picture header. Alternatively, or additionally the syntax element can be sh_Th_tool1_in_sh transmitted in the slice header.

The advantage of this is a more flexibility. Indeed, for some video sequences for some video coding applications, the structure of the GOP structure is relatively simple, as only one reference frame in the past with the same QP for example, which implies that the threshold not need to be to much adapted and can be adapted only for the sequence parameters in SPS of for some pictures in PPS. In opposite for some applications the GOP structures is complex, as QP hierarchical or several temporal ID or several slices. To increase the coding efficiency and consequently the threshold needs more adaptations at picture or slice level for example.

Not Transmitting the Other Related Syntax Elements when the Transmission is Enabled at a Higher Level In a related implementation, when a syntax element indicates, the transmission of the related threshold inside a header before in the hierarchy of the headers, the corresponding syntax element for the current header is not transmitted. The hierarchy of the headers refers to the dependencies of the header and the order that these headers appear in the bitstream. Commonly, the hierarchy is the SPS, PPS, picture header, Slice header.

For example, when sps_Th_tool1_in_sps is equal to 1, the pps_Th_tool1_in_pps, ph_Th_tool1_in_ph, sh_Th_tool1_in_sh are not transmitted and set equal to 0. In opposite when the flag sps_Th_tool1_in_sps is equal to 0, the flag pps_Th_tool1_in_pps is decoded, and the decoded of each ph_Th_tool1_in_ph or sh_Th_tool1_in_sh depends on this pps_Th_tool1_in_pps value.

The advantage on this is a bitrate reduction as some flags don't need to be transmitted for some cases.

Transmitting a Syntax Element to Switch to a Default Value

A syntax element indicates that the threshold is signaled (for example as described above/below) or set equal to a default value. For example, a flag at slice level sh_signal_Th_tool1, when set equal to 1 indicates that another syntax element is decoded to signal the threshold and when set equal to 0, the threshold is not transmitted and set to the default value. This default value may be a value transmitted in a higher level.

This syntax element can be signaled at other levels so that all lower levels inherit this feature.

Transmitting a Syntax Element to Switch to a Default Criterion

Alternatively, the syntax element indicates that the decision is taken with a criterion which doesn't depend on any threshold.

The advantage of these examples is a coding efficiency improvement for some applications. Indeed, sometimes, the adaptively of the threshold is not efficient as the adaptation needs too many bits which impact the bitrate. For example, when a picture contains several slices and the threshold should ideally be adapted for each slice, the signaling of the threshold impacts the global bitrate more than its adaptation.

Decision Methods

The following description relates to the types of decoding decisions which a threshold may influence. It should be noted that several thresholds may be signalled/derived, and/or one threshold could be reused for multiple decoding decisions.

The Threshold is a Threshold Used in the DMVR Method

In one category of implementations, the threshold is used in a decoder side method to avoid an additional search. For example, the VVC DVMR (Decoder Side Motion Vector Refinement) avoid additional motion vector refinements based on the distortion between the two blocks from list L0 or L1. For example, the algorithm does not apply the refinement when the sum of absolute difference between luma samples of these blocks is inferior to the number sample of the current luma block. So, this criterion is not adapted to the quality.

The advantage of transmitting the threshold for the DMVR method (which is fixed in VVC), is that it offers a possible complexity versus coding efficiency compromise at encoder side, without impacting the worst-case complexity. So, without impacting the availability of the decoder to decode such bitstream. In particular, the encoder can adapt the complexity of DMVR to the quality of the block, slice, frame, or sequence.

Using the Threshold for Cost Comparison in a Decoder Side Reordering Method or Decoder Side Selection Method of a Predictors List In another category of implementations, the threshold is used for cost comparison in a decoder side reordering method or decoder side selection method of a predictors list. For example, the threshold is used in the cost comparison of candidates for the purpose of selection or reordering of candidates in a merge candidates list. For example, the threshold can be a Lagrangian parameter (also referred to as 'lambda')). In the same way, this threshold can be used for selection or reordering candidates in an intra predictors list.

The advantage is a coding efficiency improvement of the method where the threshold depends on several parameters and determined by the encoder.

Thresholds for Several Modes Even if the Same Method.

In another category of implementations, several threshold values are transmitted for a same method, these thresholds value corresponds to several modes of set of modes where this same decision method at decoder side is applied.

Indeed, the different modes produce different types of block predictors, and the decision method can be adapted in order to produce the best global coding efficiency. So, there is an advantage of setting different threshold values for the same method for a mode or a set of modes.

In the following, a single threshold for one tool, (tool1) is described, but this can be expanded for several thresholds for several tools, tool2, tool3 etc., Threshold Values Signalling The following description relates to the manner in which the threshold(s) is/are signaled in the header.

Signal the Maximum Number of Bits

The maximum number of bits needed to signal the threshold value is transmitted and the value of the threshold is decoded according to the number of bits.

For example, a syntax element sps_log 2_bits_Th_tool1 is transmitted in the SPS, and then threshold(s) are decoded according to the value of sps_log 2_bits_Th_tool1. For example, for each threshold, N bits are decoded and N is the value of sps_log 2_bits_Th_tool1.

This maximum number of bits may be transmitted at a higher level. For example, when the syntax element sps_log 2_bits_Th_tool1, the thresholds decoded, at PPS, picture header or slice are decoded based on this number of bits.

The advantage of these signaling methods is a coding efficiency improvement. Indeed, the threshold value depends on encoder parameters and for certain configurations or sequences the encoder knows the maximum value of the threshold which should be transmitted. This method has an advantage compared to a method which encodes the threshold based on unary code (described below) when the threshold is not close to zero. Indeed, the thresholds considered have high values and unary code produce higher rate.

Signal the Number of Bits Used to Signal the Threshold

Alternatively, the number of bits is signaled for each threshold transmitted.

The advantage of this embodiment is coding efficiency improvement when the threshold value is highly variable. In that case some bits can be saved.

Threshold is Transformed or Quantized.

Additionally, the threshold may be transformed. For example, it is quantized. For example, it is quantized at encoder side and when received at decoder side it is dequantized.

The advantage is a reduction of the number of bits needed to code the threshold. And it is also efficient whatever if the threshold is coded with a number of bits or with a unary code. The quantization is efficient as the threshold values used have large values but a high precision doesn't offer coding efficiency improvement.

For example, the threshold is shifted with a right shift at encoder side and then transmitted. Then the decoder applies the corresponding left shift to the decoded value to obtained the threshold to be used for the decoding process. The encoder shall apply the left shift also to use the correct threshold value at encoder side.

Another example, it is to applied a square root operation to the threshold value at encoder side and the square operation to the decode the threshold at decoder side. In that case we consider that the obtained threshold after the square root operation is truncated to an integer value.

This operation offers a higher quantization which is needed for some thresholds, such as when the threshold values are high.

Thresholds Prediction

Another way of reducing the bitrate is to derive the threshold via prediction instead of directly signaling it.

In one example, the threshold is predicted. At encoder side a difference between the threshold value is its predictor value is encoded, this difference can be called a 'residual'. And at decoder side the decoded residual is added to the predictor value to obtain the threshold.

The advantage is a bitrate reduction for the encoded threshold.

In one example, the predictor is a threshold which has previously been decoded (or encoded at encoder side).

The advantage, is a bitrate reduction as the previously encoded threshold should be close to the current threshold values.

Threshold Predicted by Another Threshold Transmitted in a Higher Level

In one example, the threshold is predicted by a threshold transmitted at a higher level (if available). In particular, this predictor threshold can be transmitted for the prediction only. For example, the threshold value at slice header is predicted by the threshold value transmitted in the picture header. So, when a picture contains several slices, the thresholds at slice level should be not so different and correctly predicted by the predictor value transmitted in the picture header as the values of threshold for difference slices should be close to this picture header value. For example, the higher level predictor could be a mean or mode of the predictors used at lower levels, or specifically chosen at encoder side to minimize the total residual transmitted.

This method offers a bitrate reduction, especially if the threshold is coded thanks to a unary code.

Threshold Represented by an Index

In one example, the threshold is represented by an index in the bitstream. The index corresponds to a threshold value that both encoder and decoder both know.

The set of values corresponding to the index may be transmitted (for example at a high level).

These variables may be transmitted by first transmitting a variable indicating the number thresholds. Then the thresholds are decoded and the indexes corresponds to the decoded order of these decoded thresholds.

In this example, the set of thresholds is transmitted in a higher level. For example, the set of thresholds can be transmitted in the SPS and used at picture header or slice header. The following syntax table of an SPS illustrates this embodiment. So, the set of thresholds is transmitted in the SPS. First, a flag, sps_Th_tool1_enabled_flag, indicated if the threshold for the related tool 1 is enabled. If this flag is set equal to 1, the syntax element sps_num_Th_in_set_tool1, representing the number of thresholds in the set, is decoded. Then the number of bits for each threshold, sps_log 2_bits_Th_tool1, is decoded. In this example, this syntax element is coded with 4 bits. So, by considering that the 0 bit is not possible, it means that the number of bits for the related threshold is between 1 to 16 bits. So, a threshold, in this example, is between 0 to 2 power of 16, so 65536.

Then for i equal to 0 until sps_num_Th_in_set_tool1, the threshold values sps_Th_tool1_predictors[i] are decoded.

|  | Descriptor |
|---|---|
| seq_parameter_set_rbsp( ) { | |
| . . . | |
| sps_Th_tool1_enabled_flag | u(1) |
| if(sps_Th_tool1_enabled_flag) { | |
| sps_Th_tool1_based_th_set_flag | u(1) |
| if(sps_Th_tool1_based_th_set_flag) { | |
| sps_num_Th_in_set_tool1 | ue(v) |
| sps_log2_bits_Th_tool1 | u(4) |
| for( i = 0; i < sps_num_Th_in_set_tool1; i++ ) | |
| sps_Th_tool1_predictors[i] | u(v) |
| } | |
| } | |
| . . . | |

The following syntax table illustrates a corresponding slice header. In this example we consider that the threshold is signaled for tool1 in the slice header. If the current method is the method based on threshold index (sps_Th_tool1_based_th_set_flag equal 1), the related index sh_Th_tool1_idx is decoded. The decoder has this value in memory thanks to the table sps_Th_tool1_predictors[ ]. So the current decoded threshold for the current slice is set equal to sps_Th_tool1_predictors[sh_Th_tool1_idx]. In this example, sh_Th_tool1_idx is coded with a unary code as the aim of this example is to reduce the rate of the thresholds signaling.

|  | Descriptor |
|---|---|
| slice_header( ) { | |
| . . . | |
| if( sps_Th_tool1_based_th_set_flag){ | |
| sh_Th_tool1_idx | ue(v) |
| if(sh_Th_tool1_idx == sps_num_Th_in_set_tool1) | |
| sh_current_Th_tool1 | u(v) |
| } | |
| . . . | |

The advantage of this is that the number of bits needed to transmit the threshold value is limited thanks to the usage of the index as the threshold generally depends on the frame hierarchy of the GOP. So many frames share the same threshold. Consequently, it is preferable to transmit the threshold value at high level and indicate an index at low level. Please note that the impact of the method is positive only if the same threshold is used for several frames or slices. If at least two thresholds are used only once the method may increase the rate.

In one example, one index represents the possibility to directly transmit a threshold value. For example, of the previous syntax table, when the decoded index, sh_Th_tool1_idx, is set equal to the number of thresholds, sps_num_Th_in_set_tool, decoded in the set in the SPS, the threshold value, sh_current_Th_tool1, is decoded for the current slice. And for example, the number of bits needed to decode the threshold is equal to the sps_log 2_bits_Th_tool1.

The advantage is a coding efficiency improvement. Indeed, when a threshold is signaled a few numbers of time, it is not needed to transmit them in the SPS, especially if there are several thresholds in that case the index signaling is not efficient and it is preferable to signal it thanks to this available index. When the encoder knows the GOP structure and when the encoder sets the SPS, and when it is able to determine the threshold to be transmitted, it can estimate based on the maximum number of bits needed for each threshold, the number of thresholds and their occurrences, which is the best compromise signaling between index or direct coding.

To improve future decoding, when the threshold value is directly transmitted at low level, it is added to the set of thresholds. For example, when the sh_current_Th_tool1 is decoded in the slice header, this value is added in the set of when the threshold depends on the QP or distance to reference frames. In that case the encoder orders the thresholds according to their number of times used. The order is from the maximum occurrence to the minimum one. These thresholds are coded in the SPS thanks to this order. Consequently, at slice level the number of bits to signal the threshold index is minimized as the most frequent threshold has the minimum number of bits.

The advantage is a rate reduction.

Threshold Prediction Based on Another Syntax Element

As discussed above, the threshold values are used to take decoding decisions. In image or video compression, for example, the decisions are taken based on the Rate distortion compromise. Consequently, the threshold values are statistically correlated to parameters which influence this compromise. The following examples improve the prediction of the threshold values according to the values of such other syntax elements.

In one example, the predictor of the threshold is obtained based on the value of another syntax element or based on a value obtained from at least one syntax element. For, example when the threshold value is determined at slice level, the decoder uses at least one syntax element or its representation and obtains the value of the related threshold according to a table which associates both. For example, a table associates different QP offset values to threshold values. And when decoding some syntax elements, the QP offset can be computed, and the related threshold determined. In VVC the QP of a slice or a picture is signaled in slice header or picture header according to a QP offset (sh_qp_delta or ph_qp_delta). This offset is then added to other values to obtain the QP of the current Slice.

The advantage is increased coding efficiency as fewer bits are needed to determine the threshold value.

The following syntax table illustrates an example of this embodiment at slice level.

| | Descriptor |
|---|---|
| slice_header( ) { | |
| . . . | |
| if( sps_Th_tool_based_th_set_flag && sps_Th_tool1_inferred_flag){ | |
| sh_Th_tool1_prediction_flag | u(1) |
| } | |
| if(!sh_Th_tool1_prediction_flag) | |
| sh_current_Th_tool1 | u(v) |
| . . . | | thresholds at the end, so, sps_Th_tool1_predictors [sps_num_Th_in_set_tool1] is set equal to sh_current_Th_tool1. And the number of thresholds, sps_num_Th_in_set_tool1 is incremented.

In addition, thanks to this method, the thresholds set doesn't need to be transmitted in the SPS or any thresholds as all thresholds can be added 'on the fly'.

This embodiment is advantageous for the encoder which change the parameters frame by frame to be adapted to a target rate for example. For such cases, the encoder cannot know in advance the number of thresholds, their values etc., Encoder Ordering the Threshold According to their Estimated Frequencies.

To further reduce the bitrate, the encoder may order the thresholds according to their occurrences. For example, the encoder knows all possible thresholds needed to be transmitted and the number of times that each of these thresholds need to be signaled when it defines the SPS. This can be for example performed by analyzing the reference pictures list A Flag Signals that the Threshold is Correctly Predicted.

In one example, a flag in a header signals that the threshold is correctly predicted. In the example of the previous syntax element table for slice, this flag is sh_Th_tool1_prediction_flag, and when it is equal to 1 the decoder set the threshold value equals to the threshold value of the corresponding the syntax element or its representation obtained previously during the decoding of the slice header.

The advantage of this is that the threshold is represented at slice level with only one bit when the encoder was able to determine the threshold based on the syntax element.

Decoder Verifies if a Threshold is Associated to the Syntax Element or on a Value Obtained from at Least One Syntax Element In one example, the decoder verifies if a threshold is associated to the syntax element or to a value obtained from at least one syntax element. If it is the case, the threshold value associated is set as the decoded threshold value.

The advantage compared to the previous example is that there is no rate associated to the threshold value when it is possible to identify it. However, there is no possibility to signal that the predicted value is not the correct one. So, the implementation of this depends on the flexibility that it is desirable for the transmitted thresholds compared to the rate saved.

Signaling to Switch Between Flag Signaling of Inference Signaling

To provide both flexibility and rate saving, a flag from a higher level signals that the prediction is correct thanks to a flag or if the prediction imposed. For example, in the previous syntax table a flag sps_Th_tool1_inferred_flag, indicates if a flag (sh_Th_tool1_prediction_flag) signals that the threshold is correctly predicted by the associated threshold in the table or if the threshold is inferred based on associated threshold in the table. sps_Th_tool1_inferred flag has been transmitted in the SPS for example. In other words, a flag indicates which of the above two method to use (signalling that the threshold is correctly predicted, or verifying if a threshold is associated to the syntax element or on a value obtained from at least one syntax element).

The advantage is that the encoder can select the best way to signal the threshold. This decision may be based on the number of slices per frame for example.

When not Correctly Predicted the Threshold is Directly Decoded

In one embodiment, when the flag, sh_Th_tool1_prediction_flag, is set equal to 0 or when there is no associated threshold in the table, the threshold value is directly decoded. In the previous syntax table, when sh_Th_tool1_prediction_flag is equal to 0, the syntax element sh_current_Th_tool1 is decoded and the threshold for the current slice is set equal to sh_current_Th_tool1. In this example, when the threshold is inferred by the value in the table sh_Th_tool1_prediction_flag is set equal to 1 and when it is not possible to infer it sh Th_tool1_prediction_flag is set equal to 0.

The advantage is that the threshold can be set equal to another value than the value presents in the table or when there is no value available.

In addition, when the threshold is decoded the number of bits can be a maximum default possible value.

Indeed, if a threshold can't be determined by the encoder when the SPS is determined for example, the threshold value could be higher than the maximum threshold determine thanks to the variable sps_log 2_bits_Th_tool1 for example.

Threshold Represented by an Index

In a similar way as described above, an index can be transmitted to set another threshold value in the table.

In one example, when a new threshold is directly decoded, the value of another syntax element or a value obtained from at least one syntax element is added in the table with the decoded threshold.

The advantage is for the encoders which are not able to determine the list of syntax element values or values obtained from at least one syntax element previously. Thanks to this embodiment the table can be updated 'on the fly'.

In one example, the set of thresholds is transmitted in a higher level and corresponds to the possible values identified in the set of possible values related to the value of another syntax element or to a value obtained from at least one syntax element. For example, the set of thresholds is transmitted inside the SPS and the thresholds are determined picture per picture thanks information in the picture header or slice by slice thanks to the slice header information.

The following syntax element table illustrates this embodiment when considering the QP offset. Thanks to the syntax element of the reference pictures list decoded, the decoder identified the number of QP or QP offsets which should be used in the sequence. In the same way the list of the related QP or QP offsets QPOffsetList[ ] has been also extracted from the reference pictures list for example.

In the following syntax table, the thresholds predictors sps_Th_tool1_predictors[i] are decoded form 0 to the number of QP offsets.

| | Descriptor |
|---|---|
| seq_parameter_set_rbsp( ) { | |
| . . . | |
| sps_Th_tool1_enabled_flag | u(1) |
| if(sps_Th_tool1_enabled_flag) { | |
| sps_Th_tool1_based_th_set_flag | u(1) |
| if(sps_Th_tool1_based_th_set_flag) { | |
| sps_Th_tool1_inferred_flag | u(1) |
| sps_log2_bits_Th_tool1 | u(4) |
| for( i = 0; i < Num_QP_Offset; i++ ) | |
| sps_Th_tool1_predictors[i] | u(v) |
| } | |
| } | |
| . . . | |

In one example, the number of elements in the table is transmitted in the bitstream.

In that case the table of syntax elements is similar as the table syntax elements of embodiments related to thresholds prediction based on index where the number sps_num_Th_in_set_tool1 is transmitted.

The advantage of this embodiment is the flexibility as the encoder doesn't need to transmit the full table.

In one example, a set of the related values of another syntax element or a set of values obtained from at least one syntax element is transmitted with their related Threshold values in higher level. Compared to the previous example, the associated values to the thresholds are explicitly signaled.

The following syntax table illustrates this embodiment. In this syntax table, each QP or QP offset (sps_qp_offset_for_tool1[i]) is transmitted with the related threshold (sps_Th_tool1_predictors[i]) in order to create the table which associates both. The QP offsets are coded thanks to a signed unary max code.

| | Descriptor |
|---|---|
| seq_parameter_set_rbsp( ) { | |
| . . . | |
| sps_Th_tool1_enabled_flag | u(1) |
| if(sps_Th_tool1_enabled_flag) { | |
| sps_Th_tool1_based_th_set_flag | u(1) |
| if(sps_Th_tool1_based_th_set_flag) { | |
| sps_Th_tool1_inferred_flag | u(1) |
| sps_num_Th_in_set_tool1 | ue(v) |
| sps_log2_bits_Th_tool1 | u(4) |
| for( i = 0; i < sps_num_Th_in_set_tool1; i++ ) { | |
| sps_qp_offset_for_tool1[i] | se(v) |
| sps_Th_tool1_predictors[i] | u(v) |
| } | |
| } | |
| . . . | |

In other words, a threshold is determined from a header by predicting the threshold based on a syntax element which relates to the same header. An association between the syntax element and a threshold value is determined from a table. Each syntax element is transmitted along with its associated threshold so as to generate the table.

An advantage of this is that the decoder doesn't need to parse the reference pictures list to identify the different possible QP or QP offsets which are used the following frames or slices. As the impact of signaling at SPS level can be considered as small compared to the complexity of for the parsing to determine the list of QP or QP offsets used.

In a particularly advantageous implementation, the set of related syntax element values or a set of values obtained from at least one syntax element is predictively coded. For, example, the encoder orders the QP offsets from the minimum one to the maximum one. And this list contains only unique value of QP offsets. The following table of syntax elements for an SPS, illustrates the decoding process. The first QP offset is decoded sps_qp_offset_for_tool1[0] (if (i==0)) followed by the related threshold value sps_Th_tool1_predictors[i].

For the other i values, if the previous qp offset, sps_qp_offset_for_tool1[i−1], is negative the QP offset difference qp_offset is extracted by decoding it with a sign unary code (se(v)). This offset qp_offset is added to the previous QP offset sps_qp_offset_for_tool1[i−1] to obtain the current one sps_qp_offset_for_tool1[i].

Otherwise, if the previous QP offset, sps_qp_offset_for_tool1[i−1], is positive, the QP offset difference qp_offset is extracted by decoding it with a unary code (u(v)). So, without sign as it is sure that the qp_offset is positive in that case. This offset qp_offset is added to the previous QP offset sps_qp_offset_for_tool1[i−1] to obtain the current one sps_qp_offset_for_tool1[i].

| | Descriptor |
|---|---|
| seq_parameter_set_rbsp( ) { | |
| . . . | |
| sps_Th_tool1_enabled_flag | u(1) |
| if(sps_Th_tool1_enabled_flag) { | |
|   sps_Th_tool1_based_th_set_flag | u(1) |
|   if(sps_Th_tool1_based_th_set_flag) { | |
|     sps_Th_tool1_inferred_flag | u(1) |
|     sps_num_Th_in_set_tool1 | ue(v) |
|     sps_log2_bits_Th_tool1 | u(4) |
|     for( i = 0; i < sps_num_Th_in_set_tool1; i++ ) { | |
|       if( i == 0){ | |
|         sps_qp_offset_for_tool1[0] | se(v) |
|       }else { | |
|         if(sps_qp_offset_for_tool1[i−1] < 0){ | |
|           qp_offset | se(v) |
|           sps_qp_offset_for_tool1[i] = qp_offset + | |
| sps_qp_offset_for_tool1[i−1] | |
|         }else { | |
|           qp_offset | u(v) |
|           sps_qp_offset_for_tool1[i] = qp_offset + | |
| sps_qp_offset_for_tool1[i−1] | |
|         } | |
|       } | |
|       sps_Th_tool1_predictors[i] | u(v) |
|     } | |
| } | |
| . . . | |

The advantage of this is a coding efficiency improvement compared to the previous embodiment, as there is a rate reduction by using this prediction.

Ordering of the Table

The table is generated so that there are no duplicates. One method of achieving this, as mentioned previously, is for the encoder to identify the unique value of QP or QP offsets and orders the list form the minimum one to the maximum one.

Threshold Prediction Based on a Parameter Influencing the Quality of the Block

In one example, the syntax element or a set of values obtained from at least one syntax element used to determine the predictor for the threshold, is a parameter which influences the reconstructed quality.

Indeed, as mentioned previously, the threshold relates to decision which depends on the rate distortion compromise.

The parameter which significantly influences the quality is the QP or the QP offset.

Indeed, this parameter is taken into account to determine the Lagrangian parameter of the rate distortion criterion (also referred to as lambda, $\lambda$). The previously described examples, can also be based on this parameter.

The advantage is that many threshold values for decoder side decisions depend on this parameter value or are highly correlated to this parameter. So, the threshold prediction is consequently better.

In particular, the syntax element to be considered is the QP offset value.

Threshold Prediction Based on Reference Frames

In one example the syntax element or a set of values obtained from at least one syntax element, used to determine the threshold predictor, relates to the reference frames. In particular the temporal distance between the current frame and the reference frame can be considered.

The reference frame, the quality of the reference frame, and distance influence the quality of the reconstructed frame. So, for some threshold values of some decoder decision methods these parameters are correlated.

In one example, when the QP signaling is per block, a similar table of QP or QP offsets with the related thresholds is transmitted in at least one header and the threshold is adapted at block level thanks to this table of thresholds.

As for the previous examples, less rate is needed to signal the thresholds, consequently, a coding efficiency is obtained.

All these embodiments can be combined unless explicitly stated otherwise. Indeed, many combinations are synergetic and may produce efficiency gains greater than a sum of their parts.

Implementation of the Invention

Figure 22:
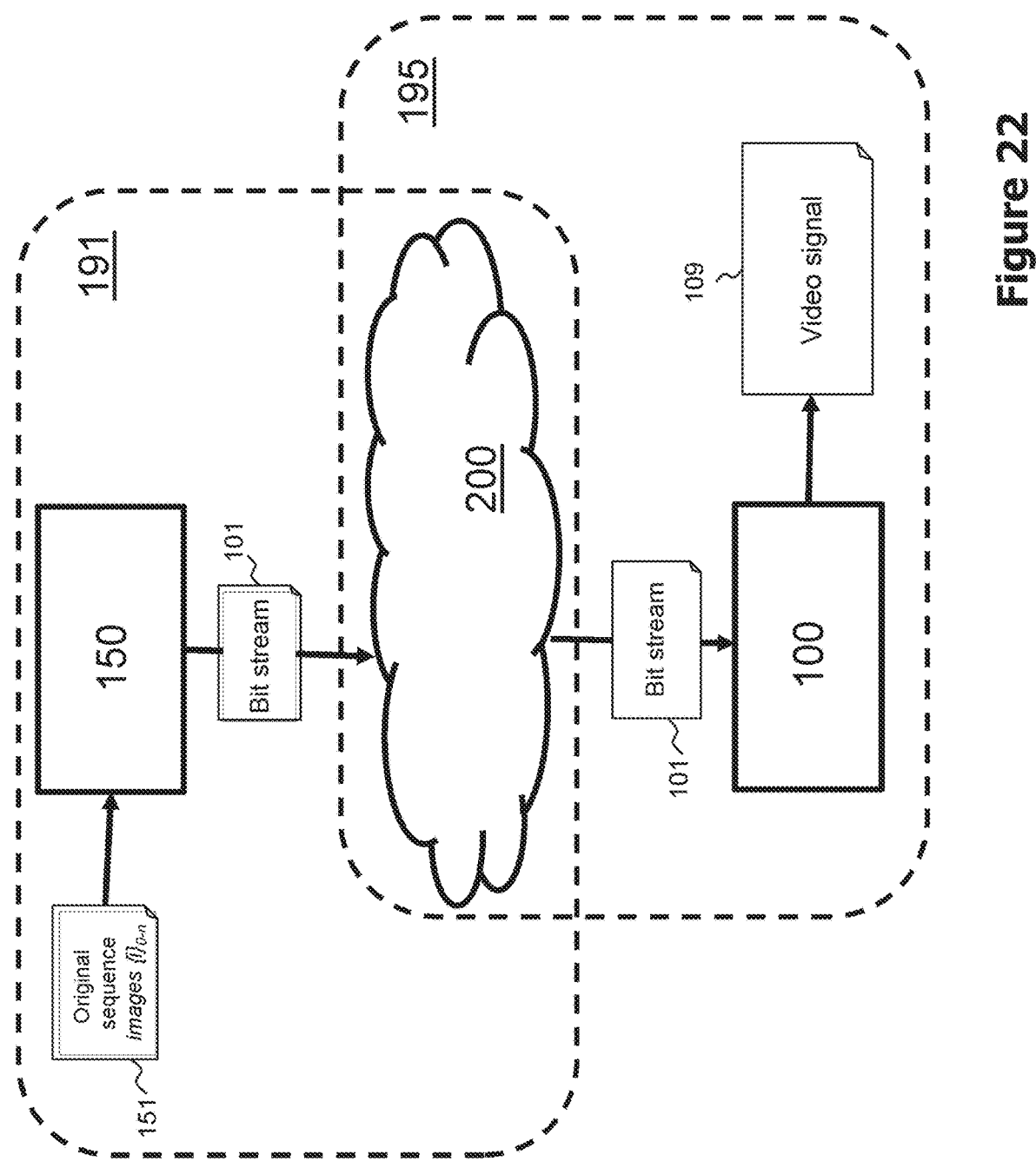
FIG. 22 is a diagram showing a system comprising an encoder or a decoder and a communication network according to embodiments of the present invention.

FIG. 22 shows a system 191 195 comprising at least one of an encoder 150 or a decoder 100 and a communication network 199 according to embodiments of the present invention. According to an embodiment, the system 195 is for processing and providing a content (for example, a video and audio content for displaying/outputting or streaming video/audio content) to a user, who has access to the decoder 100, for example through a user interface of a user terminal comprising the decoder 100 or a user terminal that is communicable with the decoder 100. Such a user terminal may be a computer, a mobile phone, a tablet or any other type of a device capable of providing/displaying the (provided/streamed) content to the user. The system 195 obtains/receives a bitstream 101 (in the form of a continuous stream or a signal—e.g. while earlier video/audio are being displayed/output) via the communication network 199. According to an embodiment, the system 191 is for processing a content and storing the processed content, for example a video and audio content processed for displaying/outputting/streaming at a later time. The system 191 obtains/receives a content comprising an original sequence of images 151, which is received and processed (including filtering with a deblocking filter according to the present invention) by the encoder 150, and the encoder 150 generates a bitstream 101 that is to be communicated to the decoder 100 via a communication network 191. The bitstream 101 is then communicated to the decoder 100 in a number of ways, for example it may be generated in advance by the encoder 150 and stored as data in a storage apparatus in the communication network 199 (e.g. on a server or a cloud storage) until a user requests the content (i.e. the bitstream data) from the storage apparatus, at which point the data is communicated/streamed to the decoder 100 from the storage apparatus. The system 191 may also comprise a content providing apparatus for providing/streaming, to the user (e.g. by communicating data for a user interface to be displayed on a user terminal), content information for the content stored in the storage apparatus (e.g. the title of the content and other meta/storage location data for identifying, selecting and requesting the content), and for receiving and processing a user request for a content so that the requested content can be delivered/streamed from the storage apparatus to the user terminal. Alternatively, the encoder 150 generates the bitstream 101 and communicates/streams it directly to the decoder 100 as and when the user requests the content. The decoder 100 then receives the bitstream 101 (or a signal) and performs filtering with a deblocking filter according to the invention to obtain/generate a video signal 109 and/or audio signal, which is then used by a user terminal to provide the requested content to the user.

Any step of the method/process according to the invention or functions described herein may be implemented in hardware, software, firmware, or any combination thereof. If implemented in software, the steps/functions may be stored on or transmitted over, as one or more instructions or code or program, or a computer-readable medium, and executed by one or more hardware-based processing unit such as a programmable computing machine, which may be a PC ("Personal Computer"), a DSP ("Digital Signal Processor"), a circuit, a circuitry, a processor and a memory, a general purpose microprocessor or a central processing unit, a microcontroller, an ASIC ("Application-Specific Integrated Circuit"), a field programmable logic arrays (FPGAs), or other equivalent integrated or discrete logic circuitry. Accordingly, the term "processor" as used herein may refer to any of the foregoing structure or any other structure suitable for implementation of the techniques describe herein.

Embodiments of the present invention can also be realized by wide variety of devices or apparatuses, including a wireless handset, an integrated circuit (IC) or a set of JCs (e.g. a chip set). Various components, modules, or units are described herein to illustrate functional aspects of devices/apparatuses configured to perform those embodiments, but do not necessarily require realization by different hardware units. Rather, various modules/units may be combined in a codec hardware unit or provided by a collection of interoperative hardware units, including one or more processors in conjunction with suitable software/firmware.

Embodiments of the present invention can be realized by a computer of a system or apparatus that reads out and executes computer executable instructions (e.g., one or more programs) recorded on a storage medium to perform the modules/units/functions of one or more of the above-described embodiments and/or that includes one or more processing unit or circuits for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more processing unit or circuits to perform the functions of one or more of the above-described embodiments. The computer may include a network of separate computers or separate processing units to read out and execute the computer executable instructions. The computer executable instructions may be provided to the computer, for example, from a computer-readable medium such as a communication medium via a network or a tangible storage medium. The communication medium may be a signal/bitstream/carrier wave. The tangible storage medium is a "non-transitory computer-readable storage medium" which may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like. At least some of the steps/functions may also be implemented in hardware by a machine or a dedicated component, such as an FPGA ("Field-Programmable Gate Array") or an ASIC ("Application-Specific Integrated Circuit").

Figure 23:
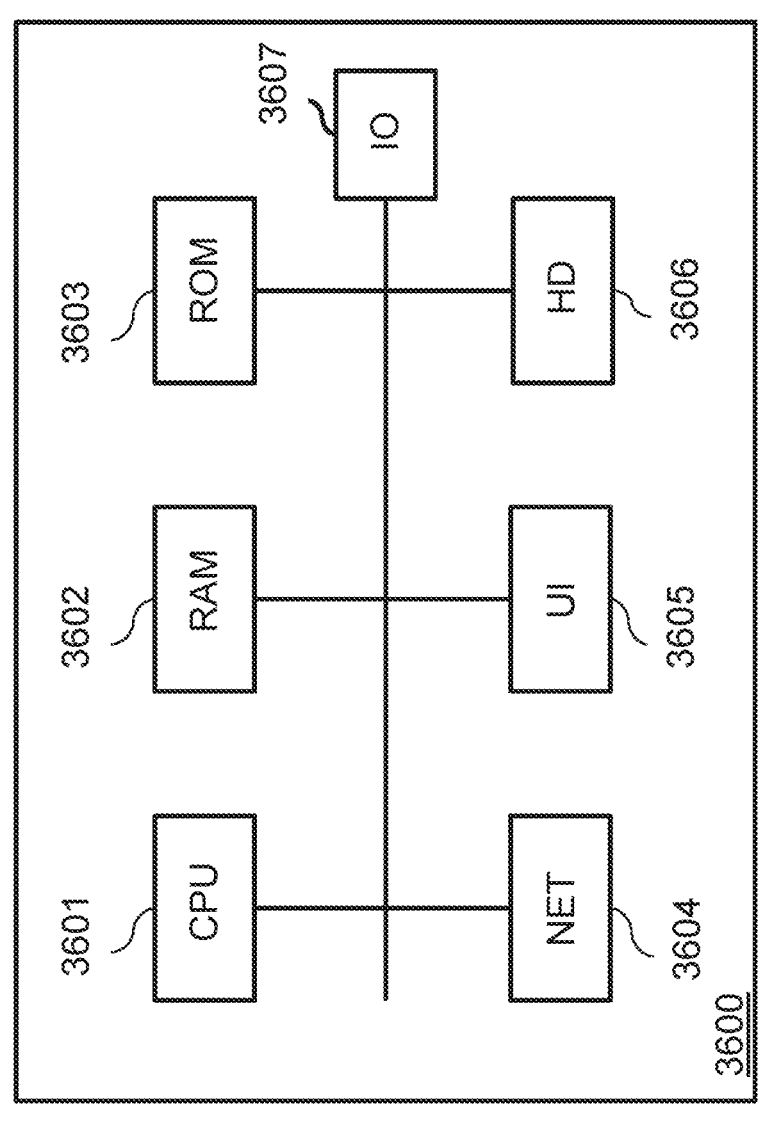
FIG. 23 is a schematic block diagram of a computing device for implementation of one or more embodiments of the invention.

FIG. 23 is a schematic block diagram of a computing device 3600 for implementation of one or more embodiments of the invention. The computing device 3600 may be a device such as a micro-computer, a workstation or a light portable device. The computing device 3600 comprises a communication bus connected to: —a central processing unit (CPU) 3601, such as a microprocessor; —a random access memory (RAM) 3602 for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example; —a read only memory (ROM) 3603 for storing computer programs for implementing embodiments of the invention; —a network interface (NET) 3604 is typically connected to a communication network over which digital data to be processed are transmitted or received. The network interface (NET) 3604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 3601; —a user interface (UI) 3605 may be used for receiving inputs from a user or to display information to a user; —a hard disk (HD) 3606 may be provided as a mass storage device; —an Input/Output module (IO) 3607 may be used for receiving/sending data from/to external devices such as a video source or display. The executable code may be stored either in the ROM 3603, on the HD 3606 or on a removable digital medium such as, for example a disk. According to a variant, the executable code of the programs can be received by means of a communication network, via the NET 3604, in order to be stored in one of the storage means of the communication device 3600, such as the HD 3606, before being executed. The CPU 3601 is adapted to control and direct the execution of the instructions or portions of software code of the program or programs according to embodiments of the invention, which instructions are stored in one of the aforementioned storage means. After powering on, the CPU 3601 is capable of executing instructions from main RAM memory 3602 relating to a software application after those instructions have been loaded from the program ROM 3603 or the HD 3606, for example. Such a software application, when executed by the CPU 3601, causes the steps of the method according to the invention to be performed.

It is also understood that according to another embodiment of the present invention, a decoder according to an aforementioned embodiment is provided in a user terminal such as a computer, a mobile phone (a cellular phone), a table or any other type of a device (e.g. a display apparatus) capable of providing/displaying a content to a user. According to yet another embodiment, an encoder according to an aforementioned embodiment is provided in an image capturing apparatus which also comprises a camera, a video camera or a network camera (e.g. a closed-circuit television or video surveillance camera) which captures and provides the content for the encoder to encode. Two such examples are provided below with reference to FIGS. 37 and 38.

Figure 24:
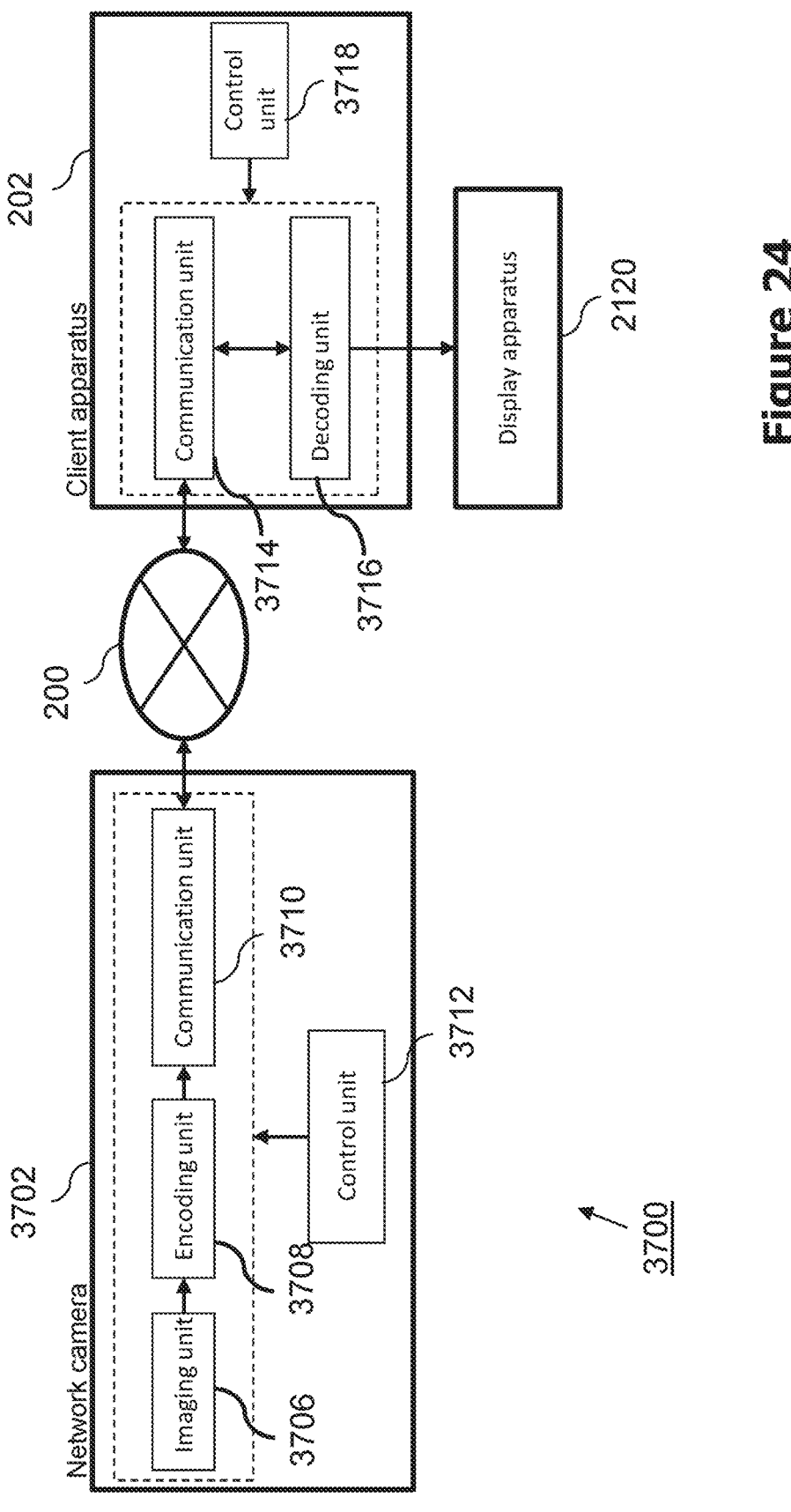
FIG. 24 is a diagram illustrating a network camera system.

FIG. 24 is a diagram illustrating a network camera system 3700 including a network camera 3702 and a client apparatus 202.

The network camera 3702 includes an imaging unit 3706, an encoding unit 3708, a communication unit 3710, and a control unit 3712.

The network camera 3702 and the client apparatus 202 are mutually connected to be able to communicate with each other via the network 200.

The imaging unit 3706 includes a lens and an image sensor (e.g., a charge coupled device (CCD) or a complementary metal oxide semiconductor (CMOS)), and captures an image of an object and generates image data based on the image. This image can be a still image or a video image.

The encoding unit 3708 encodes the image data by using said encoding methods explained above. or a combination of encoding methods described above.

The communication unit 3710 of the network camera 3702 transmits the encoded image data encoded by the encoding unit 3708 to the client apparatus 202.

Further, the communication unit 3710 receives commands from client apparatus 202. The commands include commands to set parameters for the encoding of the encoding unit 3708.

The control unit 3712 controls other units in the network camera 3702 in accordance with the commands received by the communication unit 3712.

The client apparatus 202 includes a communication unit 3714, a decoding unit 3716, and a control unit 3718.

The communication unit 3714 of the client apparatus 202 transmits the commands to the network camera 3702.

Further, the communication unit 3714 of the client apparatus 202 receives the encoded image data from the network camera 3712.

The decoding unit 3716 decodes the encoded image data by using said decoding methods explained above, or a combination of the decoding methods explained above.

The control unit 3718 of the client apparatus 202 controls other units in the client apparatus 202 in accordance with the user operation or commands received by the communication unit 3714.

The control unit 3718 of the client apparatus 202 controls a display apparatus 2120 so as to display an image decoded by the decoding unit 3716.

The control unit 3718 of the client apparatus 202 also controls a display apparatus 2120 so as to display GUI (Graphical User Interface) to designate values of the parameters for the network camera 3702 includes the parameters for the encoding of the encoding unit 3708.

The control unit 3718 of the client apparatus 202 also controls other units in the client apparatus 202 in accordance with user operation input to the GUI displayed by the display apparatus 2120.

The control unit 3718 of the client apparatus 202 controls the communication unit 3714 of the client apparatus 202 so as to transmit the commands to the network camera 3702 which designate values of the parameters for the network camera 3702, in accordance with the user operation input to the GUI displayed by the display apparatus 2120.

Figure 25:
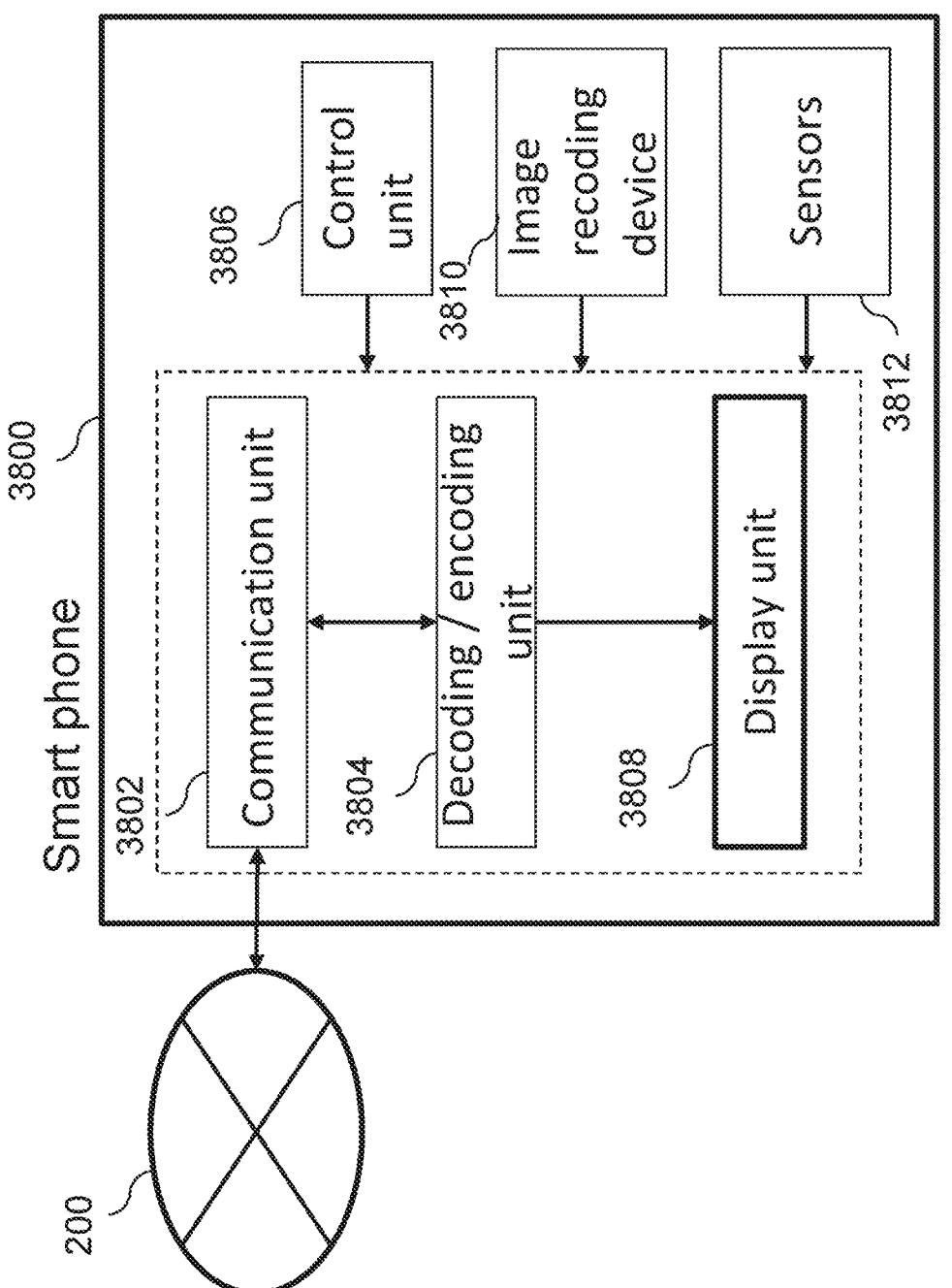
FIG. 25 is a diagram illustrating a smart phone.

FIG. 25 is a diagram illustrating a smart phone 3800.

The smart phone 3800 includes a communication unit 3802, a decoding unit 3804, a control unit 3806 and a display unit 3808.

the communication unit 3802 receives the encoded image data via network 200.

The decoding unit 3804 decodes the encoded image data received by the communication unit 3802.

The decoding/encoding unit 3804 decodes/encodes the encoded image data by using said decoding methods explained above.

The control unit 3806 controls other units in the smart phone 3800 in accordance with a user operation or commands received by the communication unit 3806.

For example, the control unit 3806 controls a display unit 3808 so as to display an image decoded by the decoding unit 3804. The smart phone 3800 may also comprise sensors 3812 and an image recording device 3810. In such a way, the smart phone 3800 may record images, encode the images (using a method described above).

The smart phone 3800 may subsequently decode the encoded images (using a method described above) and display them via the display unit 3808—or transmit the encoded images to another device via the communication unit 3802 and network 200.

ALTERNATIVES AND MODIFICATIONS

While the present invention has been described with reference to embodiments, it is to be understood that the invention is not limited to the disclosed embodiments. It will be appreciated by those skilled in the art that various changes and modification might be made without departing from the scope of the invention, as defined in the appended claims. All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

It is also understood that any result of comparison, determination, assessment, selection, execution, performing, or consideration described above, for example a selection made during an encoding or filtering process, may be indicated in or determinable/inferable from data in a bitstream, for example a flag or data indicative of the result, so that the indicated or determined/inferred result can be used in the processing instead of actually performing the comparison, determination, assessment, selection, execution, performing, or consideration, for example during a decoding process.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

Reference numerals appearing in the claims are by way of illustration only and shall have no limiting effect on the scope of the claims.

The invention claimed is:

1. A method of decoding an image portion, the method comprising:

determining a threshold value from a header associated with the image portion, wherein a decoding criterion is based on said threshold value, and wherein determining the threshold value further comprises determining an index, the index corresponding to the threshold value from among a set of threshold values; and decoding said image portion based on said decoding criterion.

2. The method of claim 1, further comprising decoding at least one syntax element in the header which is capable of indicating the presence of at least one threshold value in that header.

3. The method of claim 2, wherein the syntax element is also capable of indicating that no threshold value is transmitted and that the decoding process uses an alternative method.

4. The method according to claim 1, comprising skipping decoding of the corresponding syntax elements in hierarchically lower headers in the case where the syntax element indicates the presence of the threshold value.

5. The method according to claim 1, wherein the decoding comprises a decision to perform motion vector refinement based on the criterion.

6. The method of claim 1, comprising receiving the set of threshold values.

7. The method of claim 6, wherein the set of threshold values are transmitted in a hierarchically higher level than the header.

8. The method of claim 6, comprising decoding a variable indicating the number of threshold values.

9. The method of claim 6, wherein the set of threshold values is transmitted in a parameter set at a level relating to a plurality of image portions.

10. The method of claim 9, wherein the parameter set at a level relating to a plurality of image portions is a sequence parameter set.

11. The method of claim 1, wherein a threshold value not included in the set of threshold values is decoded from the header based on a value of the index.

12. The method of claim 11, wherein the value of the index is a maximum value.

13. The method of claim 11, further comprising adding the threshold value decoded from the header to the set of threshold values and associating this with the index.

14. A method of encoding a header associated with a plurality of image portions, the method comprising:

determining a threshold value for each image portion, said threshold value to be used to determine a decoding criterion for said image portion;

generating an index of a threshold value from among a set of threshold values;

wherein said index is ordered based on a frequency of occurrence of the threshold values; and encoding the index into the header.

15. The method of claim 14, wherein the header is a sequence parameter set (SPS).

16. An apparatus for decoding image data from a bitstream, the apparatus comprising:

a determiner which determines a threshold value from a header associated with the image portion, wherein a decoding criterion is based on said threshold value, and wherein determining the threshold value further comprises determining an index, the index corresponding to the threshold value from among a set of threshold values; and a decoding unit which decodes said image portion based on said decoding criterion.

17. An apparatus for encoding image data into a bitstream, the apparatus comprising:

a determiner which determines a threshold value for each image portion, said threshold value to be used to determine a decoding criterion for said image portion;

a generator which generates an index of a threshold values from among a set of threshold values;

wherein said index is ordered based on a frequency of occurrence of the threshold values; and an encoding unit which encodes the index into the header.

18. A non-transitory computer-readable storage medium carrying a computer program comprising instructions adapted to perform, when executed in a computing device, a method of decoding an image portion, the method comprising:

determining a threshold value from a header associated with the image portion, wherein a decoding criterion is based on said threshold value, and wherein determining the threshold value further comprises determining an index, the index corresponding to the threshold value from among a set of threshold values; and decoding said image portion based on said decoding criterion.

19. A non-transitory computer-readable storage medium storing a computer program comprising instructions adapted to perform, when executed in a computing device, a method of encoding an image portion, the method comprising:

determining a threshold value for each image portion, said threshold value to be used to determine a decoding criterion for said image portion;

generating an index of a threshold value from among a set of threshold values;

wherein said index is ordered based on a frequency of occurrence of the threshold values; and encoding the index into the header.

* * * * *